US012680851B2

(12) United States Patent
Kirst

(10) Patent No.: US 12,680,851 B2
(45) Date of Patent: Jul. 14, 2026

(54) VIBRONIC MEASURING SYSTEM

(71) Applicant: Endress+Hauser Flowtec AG, Reinach (CH)

(72) Inventor: Michael Kirst, Lörrach (DE)

(73) Assignee: Endress+Hauser Flowtec AG, Reinach (CH)

( * ) Notice: Subject to any disclaimer, the term of this patent is extended or adjusted under 35 U.S.C. 154(b) by 252 days.

(21) Appl. No.: 18/561,313

(22) PCT Filed: Apr. 20, 2022

(86) PCT No.: PCT/EP2022/060399
§ 371 (c)(1),
(2) Date: Nov. 16, 2023

(87) PCT Pub. No.: WO2022/242975
PCT Pub. Date: Nov. 24, 2022

(65) Prior Publication Data
US 2024/0255334 A1     Aug. 1, 2024

(30) Foreign Application Priority Data

May 21, 2021     (DE) ..................... 10 2021 113 360.2

(51) Int. Cl.
*G01F 1/84*          (2006.01)
*G01F 25/10*        (2022.01)
(Continued)
(52) U.S. Cl.
CPC .......... *G01F 1/8422* (2013.01); *G01F 1/8427* (2013.01); *G01F 1/8436* (2013.01);
(Continued)

(58) Field of Classification Search
CPC .... G01F 1/8422; G01F 1/8427; G01F 1/8436; G01F 25/10; G01N 9/002; G01N 11/16; G01N 2009/006
(Continued)

(56) References Cited

U.S. PATENT DOCUMENTS

2011/0167907 A1*   7/2011   Bitto ........................ G01F 15/02
                                                                        73/861.357
2012/0123705 A1     5/2012   Drahm et al.
(Continued)

FOREIGN PATENT DOCUMENTS

DE          102009055069 A1       6/2011
DE          102018102831 A1       4/2019
(Continued)

*Primary Examiner* — Peter J Macchiarolo
*Assistant Examiner* — Rodney T Frank
(74) *Attorney, Agent, or Firm* — Mark A. Logan;
Endress+Hauser (USA) Holding, Inc.

(57)          ABSTRACT

The measuring system comprises a vibration-type transducer having a tube assembly, an exciter assembly and a sensor assembly, and a measuring system electronics unit electrically coupled to the exciter assembly and the sensor assembly. The measuring system electronics unit is configured to energize vibration exciters of the exciter assembly in a first operating mode such that the tubes perform out-of-phase mechanical vibrations with a frequency predefined by the drive signal, and to receive and evaluate vibration measurement signals representing vibration movements of the useful vibrations. The measuring system electronics unit is further configured to energize the vibration exciters in a second operating mode such that the tubes perform in-phase forced mechanical vibrations with a frequency predefined by the drive signal, and to receive and evaluate vibration measurement signals representing vibration movements of the useful vibrations.

27 Claims, 5 Drawing Sheets

(51) Int. Cl.
*G01N 9/00* (2006.01)
*G01N 11/16* (2006.01)

(52) U.S. Cl.
CPC ............. *G01F 25/10* (2022.01); *G01N 9/002* (2013.01); *G01N 2009/006* (2013.01); *G01N 11/16* (2013.01)

(58) Field of Classification Search
USPC ......................................................... 73/1.16
See application file for complete search history.

(56) References Cited

U.S. PATENT DOCUMENTS

| | | | |
|---|---|---|---|
| 2014/0129156 A1 | 5/2014 | Henry et al. | |
| 2017/0248461 A1 | 8/2017 | Plaziak et al. | |
| 2020/0132529 A1 | 4/2020 | Rensing et al. | |
| 2022/0236160 A1* | 7/2022 | Zhu ........................ | G01N 11/16 |
| 2022/0412785 A1* | 12/2022 | Rieder ................... | G01F 25/10 |
| 2023/0341247 A1* | 10/2023 | Kirst .................... | G01F 1/8431 |
| 2023/0358587 A1* | 11/2023 | Kirst .................... | G01F 1/8413 |

FOREIGN PATENT DOCUMENTS

| | | | |
|---|---|---|---|
| DE | 102017131199 A1 | 6/2019 | |
| EP | 0685712 A1 | 12/1995 | |
| WO | 2010103075 A1 | 9/2010 | |
| WO | 2017019024 A1 | 2/2017 | |

* cited by examiner

VIBRONIC MEASURING SYSTEM

CROSS-REFERENCE TO RELATED APPLICATIONS

The present application is related to and claims the priority benefit of DPMA Patent Application No. 10 2021 113 360.2, filed on May 21, 2021 and International Patent Application No. PCT/EP2022/060399, filed on Apr. 20, 2022, the entire contents of which are incorporated herein by reference.

TECHNICAL FIELD

The invention relates to a vibronic measuring system, formed by means of a vibration-type transducer and a measuring system electronics unit electrically connected thereto, especially, a Coriolis mass flow measuring device or Coriolis mass flow/density measuring device, for measuring and/or monitoring at least one measured variable of a flowing measured substance.

BACKGROUND

A generic vibronic measuring system is described, for example, in US-A 2006/0266129, US-A 2007/0113678, US-A 2010/0011882, US-A 2012/0123705, US-A 2017/0356777, US-B 63 11 136, US-A 56 02 345, US-A 59 26 096, US-B 64 57 372, WO-A 2009/136943, WO-A 2019/017891, WO-A 2019/081169, WO-A 2019/081170, WO-A 2020/126285, WO-A 87/06691, WO-A 96/05484, WO-A 96/08697, WO-A 97/26508, WO-A 99/39164 or the company's own non-prepublished international patent application PCT/EP2020/084119. Each of the aforementioned measuring systems has a transducer with a tube assembly for conducting the flowing fluid, with an exciter assembly for converting electrical power into mechanical power used to excite and maintain forced mechanical vibrations of the tube assembly, and with a sensor assembly for detecting mechanical vibrations of the tube assembly and for providing vibration signals representing respective vibration movements of the tube assembly, along with measurement and operating electronics unit electrically coupled to the transducer, namely with its exciter assembly and with its sensor assembly, for controlling the transducer and for evaluating vibration signals supplied by the transducer.

The tube assemblies shown in US-A 2012/0123705, US-A 56 02 345, US-A 59 26 096, WO-A 2009/136943, WO-A 87/06691, WO-A 96/05484, WO-A 96/08697, WO-A 97/26508, WO-A 99/39164 or WO-A 2019/017891 each have a first flow divider, used here as a line-branching unit or is on the inlet side, with exactly two flow openings, a second flow divider structurally identical to the first flow divider, used here as a line-merging unit or on the outlet side, with exactly two flow openings, along with two tubes, namely a first tube and a second tube, while the tube assemblies shown in US-A 56 02 345, WO-A 96/08697, US-A 2017/0356777, WO-A 2019/081169, WO-A 2019/081170, WO-A 2020/126285 or the above-mentioned patent application PCT/EP2020/084119 each have a first flow divider, used here as a line-branching unit or is one the inlet side, with exactly two flow openings, a second flow divider structurally identical to the first flow divider, used here as a line-merging unit or is on the outlet side, with exactly two flow openings, along with two tubes, namely a first tube and a second tube. Each of the tubes of the tube assemblies in each case extends from a respective first end of the respective tube to a respective second end of the respective tube with a respective tube length, and in each case has a lumen enclosed by a metallic tube wall, in each case extending from the respective first end of the respective tube to the respective second end of said tube. Moreover, each of the tubes is in each case connected to each of the first and second flow dividers in such a way that the first tube opens, with its first end, into a first flow opening of the first flow divider and, with its second end, into a first flow opening of the second flow divider, the second tube opens, with its first end, into a second flow opening of the first flow divider and, with its second end, into a second flow opening of the second flow divider or that the first tube opens, with its first end, into a first flow opening of the first flow divider and with its second end into a first flow opening of the second flow divider, the second tube opens, with its first end, into a second flow opening of the first flow divider and, with its second end, into a second flow opening of the second flow divider, the third tube opens, with its first end, into a third flow opening of the first flow divider and, with its second end, into a third flow opening of the second flow divider, and the fourth tube opens, with its first end, into a fourth flow opening of the first flow divider and, with its second end, into a fourth flow opening of the second flow divider. In addition, each of the tubes of each of the tube assemblies is also configured to be traversed by measured material and to be vibrated during this process.

With the measuring systems shown in US-A 56 02 345, WO-A 2009/136943, WO-A 96/08697, WO-A 97/26508, WO-A 99/39164, WO-A 2019/017891 PCT/EP2020/084119, each of the excited assemblies also has two electrodynamic vibration exciters, of which a first vibration exciter is mechanically connected to the first tube and electrically connected to the measurement and operating electronics unit, and a second vibration exciter is mechanically connected to the second tube and electrically connected to the measurement and operating electronics unit. Each of the first and second vibration exciters is also configured in each case to convert electrical power into mechanical power useful for exciting vibrations of the respective tubes, or to introduce a time-varying driving force into the respective tube at a respective point of application formed by means of the respective vibration exciter on the respective tube mechanically connected thereto.

The measuring system electronics unit is in turn also configured to energize the respective vibration exciters, i.e., to generate electrical drive signals and to feed them into the vibration exciters in such a way that the first and second tubes or the first, second, third and fourth tubes at least partially perform useful vibrations, namely forced mechanical vibrations with at least one or more useful frequencies, namely vibration frequencies predefined by the drive signals, for example also corresponding to one or more resonance frequencies of the tube assembly, wherein the useful vibrations are also suitable, among other things, for causing Coriolis forces dependent on the mass flow in the measured substance flowing through the tubes in each case. For detecting vibrations of the tube assembly, the sensor assembly has four spaced-apart, for example electrodynamic, vibration sensors, of which a first vibration sensor and a second vibration sensor are mechanically connected to the first tube and to the first or third tubes, and a third vibration sensor and a fourth vibration sensor are mechanically connected to the second tube and to the second or fourth tubes. Each of the vibration sensors is also configured to detect vibration movements of the first, second, third or fourth tubes mechanically connected thereto, and to provide a first, second, third and fourth vibration signal representing the same vibration movements and to transmit the same to the measuring system electronics unit.

Furthermore, each of the aforementioned measuring systems also comprises a support frame designed as a transducer protective housing, which is fastened to the flow dividers of the tube assembly. In the case of transducers shown in WO-A 96/08697, WO-A 2019/017891 or PCT/EP2020/084119, the support frame and the tube assembly in particular are detachably connected to one another again, e.g, in order to enable the replacement of a defective or worn tube assembly with an intact tube assembly on-site.

As discussed in US-A 2012/0123705, US-A 2006/0266129, WO-A 99/39164 or PCT/EP2020/084119, among other things, transducers of the vibration type, i.e., the measuring systems formed with them, can be subjected to a large number of loads during their service life, which may extend over several years, which can cause considerable deviations of the measuring system from a reference condition determined in advance, for example during calibration in the manufacturer's factory and/or during commissioning of the measuring system, and thus significantly reduce the measuring accuracy of the measuring system, with which it ultimately maps the medium parameters to be measured into the corresponding measured values. Examples of such loads, which result in irreversible changes in the vibration behavior of the at least one measuring tube, whether they occur once or several times or permanently or only briefly, are excess temperatures, high temperature shocks or other thermally induced overloads of the at least one measuring tube, high pressure surges in the medium, excessive clamping forces and/or shaking forces exerted on the transducer on the part of the process line and associated crack formation and/or plastic deformation in the at least one measuring tube by the medium conveyed in the transducer, e.g., due to corrosion and/or abrasion, erosion of the at least one measuring tube from the inside, and therefore a reduction of the wall thickness thereof, the formation of deposits on the inner side of the at least one measuring tube contacting the medium, material fatigue or other signs of wear on the at least one measuring tube. In addition, during the service life of the measuring system, the at least one vibration exciter, as well as each of the vibration sensors, can also be subjected to changes relevant to the measurement accuracy, e.g., as a result of thermally-induced overload or aging, for example, such that an electrical impedance of the transducer is also changed as a result. As a result of such loads, a transducer transfer function intrinsic to the transducer, according to which the transducer controlled by the at least one drive signal ultimately converts the respective medium parameter to be detected into the respective vibration signals, always varies in a manner that is initially not readily recognizable or predictable, but occasionally in a manner that can no longer be neglected with regard to the desired high measuring accuracy, i.e., the measuring system as a whole operates incorrectly. In addition, as a result of such overloads, which not least also affect the structural integrity of the transducer as a whole, there is a need to worry about impairments to the functionality of the measuring system or, under certain circumstances, even destruction of the transducer leading to leakage or explosion. Such changes compared to the reference condition, which also relate to the operational safety of measuring systems of the type in question, can also have catastrophic consequences for the entire process plant and the persons located therein, not least in the case of toxic and/or highly flammable media or in the case of gases under high pressure. Taking this into account, measuring systems of the type in question are usually subjected to corresponding periodic checks, for example in the course of measures associated with predictive maintenance, and if necessary, for example in the case of diagnosed increased measuring inaccuracy, are occasionally recalibrated or replaced accordingly.

For the purpose of recognizing, as early as possible, a deviation of the measuring system exceeding a predefined tolerance level from a reference state determined in advance for this purpose or, for example in the case of a tube assembly to be used subsequently or, as proposed, inter alia, in WO-A 2019/017891, on-site, a reference state predefined for this purpose, thus a diagnosis of errors of the measuring system caused by the transducer, and the accompanying immanent significant reduction in the measurement accuracy or operational reliability of measuring systems of the type in question is proposed, for example, in US-A 2012/0123705, US-A 2010/0011882, US-A 2007/0113678, WO-A 96/05484, WO-A 99/39164 US-A 59 26 096, to compare the aforementioned changes in such measuring systems based on comparisons of current vibration responses, namely those determined during operation, of selected components of the transducer or system parameters representing the same vibration responses, for example a measuring tube stiffness, a plurality of damping factors, possibly also detected on a frequency-selective basis, ratios of mechanical natural or resonance frequencies of the at least measuring tube or other system parameters describing predefined transducer transfer functions, thus characterizing the measuring system, etc., to selected—broadband or frequency-selective—vibration excitations, such as a beat or a continuous, if necessary also multi-modal, vibration excitation of one or more of the natural frequencies of the tubes, with transducer transfer functions (system functions of the transducer) determined suitably for this beforehand in the reference state of the measuring system or system parameters representing these, in order, for example, to generate a system status or fault message, for example an alarm, signaling this accordingly when a correspondingly specified threshold value representing a still acceptable tolerance level is exceeded, i.e., when a fault is diagnosed.

SUMMARY

Therefore, one of object of the invention is to improve vibronic measuring systems of the aforementioned type in such a way that—not least, however, also with the measuring systems of the "on-board" vibration exciters and sensors in question that are already conventional and thus established—the occurrence of any faults of the measuring system, such as signs of wear or aging of the respective transducer and/or a faulty assembly or installation of the transducer, which reduce the measuring accuracy and/or the operational reliability of the measuring system, may be detected as early as possible and, if necessary, also signaled; this in particular also largely independent of the medium flowing in the transducer and under extensive, if necessary also exclusive use of the designs proven for such measuring systems, not least also for the transducers installed therein up to now, and under equally extensive retention of proven technologies and architectures of measurement and operating electronics unit that are already established.

In order to achieve the object, the invention consists in a vibronic measuring system, especially a Coriolis mass flow measuring device or Coriolis mass flow/density measuring device, for measuring and/or monitoring at least one, especially time-varying, flow parameter, especially, a mass flow, a volumetric flow and/or a flow velocity, and/or for measuring and/or monitoring at least one, especially time-varying, substance parameter, especially, a density and/or a viscosity, of a flowing measured substance, especially a gas, a liquid or a dispersion, according to claim 1.

The measuring system, designed for example as an in-line measuring device and/or measuring device of compact design, comprises:

a transducer with a tube assembly for conducting the flowing measured substance, with an exciter assembly for converting electrical power into mechanical power used to excite and maintain forced mechanical vibrations of the tube assembly, and with a sensor assembly for detecting mechanical vibrations of the tube assembly and for providing vibration signals respectively representing vibration movements of the tube assembly, as well as a measuring system electronics unit, which is electrically coupled to the transducer, i.e., both to its exciter assembly and to its sensor assembly, e.g., by means of electrical connecting lines, for example, formed by means of at least one microprocessor and/or arranged in electronics protective housing, for controlling the transducer and for evaluating vibration measurement signals provided by the transducer.

The tube assembly has a first flow divider with at least two flow openings, used, for example, as line-branching unit and/or on the inlet side, a second flow divider with at least two flow openings, which is, for example, structurally identical to the first flow divider and/or is used as a line-merging unit and/or is on the outlet side along with a first tube, for example curved at least in sections and/or straight at least in sections, and a second tube, for example curved at least in sections and/or straight at least in sections and/or is structurally identical to the first tube and/or parallel to the first tube at least in sections. Each of the first and second tubes of the tube assembly extends in each case from a respective first end of the respective tube to a respective second end of the same tube with a respective tube length and has in each case a lumen enclosed by a tube wall, for example a metallic tube wall, in each case extending from the respective first end of the respective tube to the respective second end of said tube, wherein each of the first and second tubes of the tube assembly is connected in each case to each of the first and second flow dividers, in such a manner that the first tube opens, with its first end, into a first flow opening of the first flow divider and, with its second end, into a first flow opening of the second flow divider and the second tube opens, with its first end, into a second flow opening of the first flow divider and, with its second end, into a second flow opening of the second flow divider, and wherein each of the first and second tubes of the tube assembly is configured to be traversed by measured substance and to be vibrated during this. The first and second tubes of the tube assembly are thus mechanically coupled to one another at least via the first and second flow dividers, such that forced mechanical vibrations of the first tube cause coupled mechanical vibrations of the second tube and forced mechanical vibrations of the second tube cause coupled mechanical vibrations of the first tube. The exciter assembly comprises two, for example electrodynamic and/or structurally identical, vibration exciters, of which a first vibration exciter is mechanically connected to the first tube, for example positioned centrally on the first tube, and a second vibration exciter is mechanically connected to the second tube, for example positioned centrally on the second tube, and each of which is configured in each case to convert electrical power with a time-varying electrical current into mechanical power, especially in such a way that a time-varying driving force acts on the first or second tube at a respective point of application formed by means of the respective vibration exciter on the tube mechanically connected thereto in each case. The sensor assembly has at least four vibration sensors, for example electrodynamic and/or structurally identical and/or spaced apart from one another, of which a first vibration sensor and a second vibration sensor are positioned on the first tube spaced apart from one another, for example symmetrically with respect to the first vibration exciter, for example namely mechanically connected at least partially to the first tube, and a third vibration sensor and a fourth vibration sensor are positioned on the second tube spaced apart from one another, for example symmetrically with respect to the second vibration exciter, for example namely mechanically connected at least partially to the second tube. Each of the first and second vibration sensors is in each case configured to detect vibration movements of the first tube and to convert them into a first or second vibration signal representing the same vibration movements, for example electrical or optical, for example in such a way that each of the first and second vibration signals in each case contains one or more sinusoidal signal components, in each case having a frequency corresponding to a vibration frequency of vibration movements of the first tube, and each of the third and fourth vibration sensors is in each case configured to detect vibration movements of the second tube and to convert them into a respective third or fourth vibration signal representing the same vibration movements, for example electrical or optical, for example in such a way that each of the third and fourth vibration signals in each case contains one or more sinusoidal signal components, in each case having a frequency corresponding to a vibration frequency of vibration movements of the second tube.

The measuring system electronics unit in turn is configured to energize the first vibration exciter, namely to feed an electrical first drive signal into the first vibration exciter, by which the first tube performs forced mechanical vibrations, such as bending vibrations, at one or more vibration frequencies predefined by the first drive signal, and the second tube performs mechanical vibrations coupled to at least one of the vibrations of the first tube, and to energize the second vibration exciter, namely to feed simultaneously to the first drive signal an electrical second drive signal into the second vibration exciter, by which the second tube performs forced mechanical vibrations, for example bending vibrations, with one or more vibration frequencies predefined by the second drive signal and the first tube performs mechanical vibrations coupled to vibrations of the second tube.

With the measuring system according to the invention, the measuring system electronics unit is further configured in a first operating mode:

to both generate the first drive signal with at least one first useful current component, namely a sinusoidal current component that is dominant with respect to a current intensity or the only sinusoidal current component, with an (alternating current) frequency and a phase angle, and feed it into the first vibration exciter, and to generate the second drive signal with at least one first useful current component, namely a sinusoidal current component that is dominant with respect to a current intensity or the only sinusoidal current component, with an (alternating current) frequency corresponding to the (alternating current) frequency of the first useful current components of the first drive signal and a phase angle deviating from the phase angle of the first useful current components of the first drive signal, for example by 180°, and to feed it into the second vibration exciter, in such a way that the first and second drive signals have a first drive phase difference, namely a difference, for example amounting to 180°, between the phase angles of their first useful current components, that the first tube at least proportionally, for example predominantly, performs first useful vibrations, namely mechanical vibrations forced by the (energized) first vibration exciter, with at least a first useful frequency, namely a vibration frequency corresponding to the (alternating current) frequency of the first useful current component of the first drive signal, and with a first useful phase, namely a vibration phase corresponding, for example at least at the location of the first vibration exciter, to the phase angle of the first useful current component of the first drive signal, and the second tube performs at least proportionally, for example predominantly, second useful vibrations, namely mechanical vibrations forced by the (energized) second vibration exciter, with the first useful frequency and with a second useful phase, namely a vibration phase corresponding, for example at least at the location of the second vibration exciter, to the phase angle of the first useful current components of the second drive signal, for example in such a way that the second useful vibrations are in out-of-phase or opposing to the first useful vibrations and/or that the first and second useful vibrations are suitable for causing Coriolis forces in the flowing measured substance that are dependent on the mass flow, and that each of the first, second, third and fourth vibration signals in each case has a respective first useful signal component, namely a respective sinusoidal signal component having a frequency corresponding to the first useful frequency, and to receive and evaluate the first, second, third and fourth vibration signals, namely to determine measured values quantifying the at least one physical measured variable (successively in time) based on the vibration signals, for example namely based on at least one of the useful signal components in each case.

In addition, the measuring system electronics unit is in particular also configured, in a second operating mode that is activated, for example, temporally in advance of and/or temporally after the first operating mode and/or that lasts for more than 10 ms and/or is temporally limited and/or is started recurrently:

to both generate the first drive signal with a second useful current component, namely a dominant or single sinusoidal current component with respect to a current intensity or the only sinusoidal current component with an (alternating current) frequency and a phase angle, and to feed it into the first vibration exciter, and to generate the second drive signal with at least one second useful current component, namely a sinusoidal current component that is dominant with respect to a current intensity or the only sinusoidal current component with an (alternating current) frequency corresponding to the (alternating current) frequency of the second useful current components of the first drive signal and a phase angle that deviates from the phase angle of the second useful current components of the first drive signal by less than 180°, for example corresponding to the phase angle of the second useful current components of the first drive signal, and to feed it into the second vibration exciter in such a way, that the first and second drive signals have a second drive phase difference that deviates from the first drive phase difference, for example by 180°, for example by 0°, namely a difference between the phase angles of their second useful current components, that the first tube at least proportionally, for example predominantly, performs third useful vibrations, namely mechanical vibrations forced by the (energized) first vibration exciter, with at least a second useful frequency, namely a vibration frequency corresponding to the (alternating current) frequency of the second useful current component of the first drive signal, and with a third useful phase, namely a vibration phase corresponding, for example at least at the location of the first vibration exciter, to the phase angle of the second useful current component of the first drive signal, and the second tube performs at least proportionally, for example predominantly, fourth useful vibrations, namely mechanical vibrations forced by the (energized) second vibration exciter, with the second useful frequency and with a fourth useful phase, namely a vibration phase corresponding, for example at least at the location of the second vibration exciter, to the phase angle of the second useful current components of the second drive signal, for example in such a way that the fourth useful vibrations are in phase with the third useful vibrations, and that each of the first, second, third and fourth vibration signals in each case has a second useful signal component, namely a respective sinusoidal signal component having a frequency corresponding to the second useful frequency, and to receive and evaluate the first, second, third and fourth vibration signals, namely based on the first and third and/or second and fourth vibration signals received in the second operating mode, for example namely based on a respective amplitude of the second useful signal component of the first and third vibration signals and/or based on a respective amplitude of the second useful signal component of the second and fourth vibration signals and/or based on a respective phase angle of the second useful signal components of the first and third vibration signals and/or based on a respective phase angle of the second useful signal components of the second and fourth vibration signals, to calibrate the measuring system and/or to check the measuring system or to detect whether a fault of the measuring system, for example, reducing a functionality of the measuring system and/or causing a malfunction of the measuring system and/or reducing an integrity of at least one of the first, second, third and fourth vibration signals or measured values obtained therefrom and/or provoking a measurement error of measured values obtained from at least one of the first, second, third and fourth vibration signals, for example due to deposits on an inner side of the tube wall of one or more of the tubes and/or due to a reduction of a wall thickness of the tube wall of one or more of the tubes and/or due to aging of one or more of the vibration sensors and/or vibration exciters and/or a faulty assembly and/or installation of the transducer, is present.

In addition, the invention also consists of using the aforementioned measuring system for measuring at least one flow parameter, for example a mass flow and/or a volumetric flow, and/or at least one substance parameter, for example a density and/or a viscosity, of a fluid measured substance, in particular a gas, a liquid or a dispersion, flowing in a tube line.

According to a first embodiment of the invention, it is further provided that the measuring system electronics unit is configured to also receive and evaluate the first vibration signal and/or the second vibration signal in the second operating mode.

According to a second embodiment of the invention, it is further provided that the measuring system electronics unit is configured to determine measured values quantifying the at least one physical measured variable (successively in time) based on at least one of the third and fourth vibration signals received in the second operating mode, for example namely each of the third and fourth vibration signals, for example also to compare them with measured values for the same measured variable determined based on vibration signals received in the first operating mode.

According to a third embodiment of the invention, it is further provided that the measuring system electronics unit is configured to obtain or determine the respective useful signal component both from at least one of the first and second vibration signals received in the first operating mode, for example namely both in the first operating mode and in the second operating mode, for example from each of the first and second vibration signals, and also from at least one of the third and fourth vibration signals received in the first operating mode, for example from each of the third and fourth vibration signals.

According to a fourth embodiment of the invention, it is further provided that each of the useful signal components of the first, second, third and fourth vibration signals has a respective phase angle dependent on a mass flow of the measured substance. Further developing this embodiment of the invention, it is further provided that the measuring system electronics unit is configured, at least in the first operating mode, to determine, for example namely to calculate, mass flow values, namely the mass flow of the flowing measured substance, based on a first (measuring) phase difference, namely a difference between the phase angle of the useful signal component of the first vibration signal and the phase angle of the useful component of the second vibration signal, and based on a second (measuring) phase difference, namely a difference between the phase angle of the useful signal component of the third vibration signal and the phase angle of the useful signal component of the fourth vibration signal.

According to a fifth embodiment of the invention, it is further provided that the measuring system electronics unit is configured to calculate, based on one or more of the vibration signals received in the second operating mode, one or more characteristic number values for at least one measuring system characteristic number, which characterizes an operating state, for example a system function (transfer function) inherent in the measuring system that determines one or more functional dependencies of one or more of the vibration signals on one or more of the drive signals, or that determines the functionality of the measuring system, for example in such a way that said measuring system characteristic number is dependent on one or more parameters of a system function of the measuring system mediating between at least the second useful current components of the first and second drive signals and at least one of the second useful signal components of the first, second, third and fourth vibration signals. Further developing this embodiment of the invention, it is further provided that the measuring system characteristic number is dependent on a (system) amplitude ratio between a, for example absolute or relative, deviation of an amplitude of the second useful current component of the second drive signal from an amplitude of the second useful current component of the first drive signal and a, for example absolute or relative, deviation of an amplitude of the second useful signal component of the third vibration signal from an amplitude of the second useful signal component of the first vibration signal and/or a, for example absolute or relative, deviation of an amplitude of the second useful signal component of the fourth vibration signal depends on an amplitude of the second useful signal component of the second vibration signal, for example a sum of the deviations of the second useful signal components, for example said (system) amplitude ratio is quantified. According to another further development of the invention, the measuring system characteristic number is dependent on a (system) amplitude ratio between a deviation, for example absolute or relative, of an amplitude of the second useful current component of the second drive signal from an amplitude of the second useful current components of the first drive signal (e1) and a deviation ($\Delta$s13), for example absolute or relative, of an amplitude of the second useful signal component of the third vibration signal from an amplitude of the second useful signal component of the first vibration signal and/or a deviation, for example an absolute or relative deviation of an amplitude of the second useful signal component of the fourth vibration signal from an amplitude of the second useful signal component of the second vibration signal, for example a sum of the deviations of the second useful signal components, or the measuring system characteristic number quantifies the same (system) amplitude ratio. In addition, the measuring system characteristic number can also be formed such that it is dependent on a (system) phase difference between the second useful signal component of at least one of the first and second vibration measurement signals, especially, a sum of the second useful signal component of the first and second vibration signals, and the second useful signal component of at least one of the third and fourth vibration measurement signals, especially, a sum of the second useful signal component of the third and fourth vibration signals, or quantifies said (system) phase difference. Alternatively or in addition, the measuring system electronics unit may also be configured to compare one or more characteristic number values for the aforementioned measuring system characteristic number in each case with one or more reference values determined for the measuring system characteristic number, for example by the manufacturer of the measuring system and/or during manufacture and/or commissioning of the measuring system, for example one or more reference values representing a reduced functionality of the transducer and/or one or more reference values representing a malfunction of the transducer and/or one or more reference values representing a defective transducer, for example to evaluate and/or quantify a deviation of one or more of the characteristic number values from one or more of the reference values, and/or the measuring system electronics unit can furthermore be configured to determine whether one or more characteristic number values for the measuring system characteristic are greater than one or more reference values representing a reduced functionality of the transducer and/or greater than one or more reference values representing a malfunction of the transducer and/or greater than one or more reference values representing a transducer that is no longer intact, for example in order to, if necessary, output a message signaling this or declared as a (fault) alarm.

According to a sixth embodiment of the invention, it is further provided that the measuring system electronics unit has a non-volatile, electronic data memory (EEPROM) that is configured to store digital data, for example, even without an applied operating voltage, for example, to store one or more reference values determined in advance for the measuring system characteristic number.

According to a seventh embodiment of the invention, it is further provided that the measuring system electronics unit is configured to provide the first and/or second useful current components of the first and second drive signals with an (alternating current) frequency that deviates from a resonance frequency of the first tube and/or a resonance frequency of the second tube by less than 1% of said resonance frequency, fr1, and/or by less than 1 Hz.

According to an eighth embodiment of the invention, the first and second tubes have at least one common resonance frequency, fr12, and it is further provided that the measuring system electronics unit is configured to provide, in the first operating mode, the first useful current component of the first and second drive signals, in each case at an (alternating current) frequency that deviates from the same common resonance frequency, fr12, of the first and second tubes by less than 1% of the same resonance frequency, fr12, and/or by less than 1 Hz.

According to a ninth embodiment of the invention, the transducer has a first natural bending vibration mode, in which the first and second tubes can or do perform out-of-phase or opposing mechanical vibrations, for example bending vibrations (anti-parallel mode), and a second natural bending vibration mode, in which the first and second tubes can or do perform in-phase mechanical vibrations, for example bending vibrations (parallel mode). Further developing this embodiment of the invention, in the first mode of operation, the measuring system electronics unit is further configured to feed first and second drive signals into the first or second vibration exciters, forcing the out-of-phase mechanical vibrations, for example, to provide namely the first useful current components of the first and second drive signals with an (alternating current) frequency deviating from a resonance frequency, fr12, of the first natural bending vibration mode by less than 1% of the same resonance frequency and/or less than 1 Hz, and/or with phase angles causing a first drive phase difference of 180°, and, in the second mode of operation, providing the in-phase mechanical vibration forcing first and second drive signals to the first or second vibration exciters, for example, to provide namely the first useful current components of the first and second drive signals with an (alternating current) frequency deviating from a resonance frequency, fr22, of the second natural bending vibration mode by less than 1% of said resonance frequency and/or by less than 1 Hz, and/or with phase angles causing a second drive phase difference of 0°. Alternatively or in addition, the exciter assembly or the first and second vibration exciters are further configured to excite mechanical (resonance) vibrations of the first and second tubes corresponding to the aforementioned natural parallel vibration mode, especially, under the control of the first and second drive signals.

According to a tenth embodiment of the invention, it is further provided that the measuring system electronics unit is configured to generate the first and second drive signals in the first operating mode with a, for example, predefinable and/or variable, first drive amplitude difference, namely a difference, for example amounting to zero, between an amplitude of the first useful current components of the first drive signal and an amplitude of the first useful current components of the second drive signal, and to feed them into the first or second vibration exciters.

According to an eleventh embodiment of the invention, it is further provided that the measuring system electronics unit is configured to generate the first and second drive signals in the second operating mode with a second drive amplitude difference, for example corresponding to the first drive amplitude difference and/or predefinable and/or variable, namely a difference, for example amounting to zero, between an amplitude of the second useful current components of the first drive signal and an amplitude of the second useful current components of the second drive signal and to feed them into the first or second vibration exciter.

According to a twelfth embodiment of the invention, it is further provided that the measuring system electronics unit is configured, based on the first and second drive signals fed in in the second operating mode, for example, namely based on the second useful current components of the first and second drive signals, and based on the first and third vibration signals, for example based on the second useful signal components of the first and third vibration signals, and/or the second and fourth vibration signals, for example based on the second useful signal components of the second and fourth vibration signals, to determine a (modal) damping of the first and second tubes for second useful vibrations. Further developing this embodiment of the invention, it is further provided that the determined (modal) damping of the first and second tubes for second useful vibrations is compared with at least one reference value representing a reduced functionality or a defect of the transducer or, in the case of a deviation that is too large, namely that exceeds a (fault) reference value predefined for this purpose, a message is output, for example declared as a (fault) alarm.

Alternatively or in addition, the measuring system electronics unit can furthermore be configured to determine a (modal) damping of the first and second tubes for first useful vibrations based on the first and second drive signals fed in in the first operating mode, for example, namely based on the first useful current components of the first and second drive signals, and based on the first and third vibration signals, for example, namely based on the first useful signal components of the first and third vibration signals, and/or the second and fourth vibration signals, for example, namely based on the first useful signal components of the second and fourth vibration signals, for example, in order to set in relation or normalize the (modal) damping of the first and second tubes for second useful vibrations to the (modal) damping of the first and second tubes for first useful vibrations and to compare it with a correspondingly predefined (fault) reference value.

According to a thirteenth embodiment of the invention, it is further provided that the measuring system electronics unit is configured to detect, based on at least one of the first, second, third and fourth vibration signals received in the second operating mode, in particular their respective second useful signal component, whether a fault of the measuring system, for example, reducing a functionality of the measuring system and/or causing a malfunction of the measuring system and/or reducing an integrity of at least one of the first, second, third and fourth vibration signals or measured values obtained therefrom and/or provoking a measuring error of measured values obtained therefrom, for example due to deposits on an inner side of the tube wall of one or more of the tubes and/or due to a reduction of a wall thickness of the tube wall of one or more of the tubes and/or due to aging of one or more of the vibration sensors and/or vibration exciters, is present.

According to a fourteenth embodiment of the invention, it is further provided that the measuring system electronics unit is configured to determine a first (test) amplitude difference, namely a difference between an amplitude of the second useful signal components of the first and third vibration signals, based on the first and third vibration signals received in the second operating mode, especially, namely to compare it with at least one reference value representing a reduced functionality or a defect of the transducer or, in the case of a deviation that is too large, namely that exceeds a reference value predefined for this purpose, to output a message declared, especially, as a (fault) alarm.

According to a fifteenth embodiment of the invention, it is further provided that the measuring system electronics unit is configured to determine a first (test) phase difference, namely a difference between a phase angle of the second useful signal components of the first and third vibration signals, based on the first and third vibration signals received in the second operating mode, especially, namely to compare it with at least one reference value representing a reduced functionality or a defect of the transducer or, in the case of a deviation that is too large, namely that exceeds a reference value predefined for this purpose, to output a message declared, for example, as a (fault) alarm.

According to a sixteenth embodiment of the invention, it is further provided that the measuring system electronics unit is configured to determine a second (test) amplitude difference, namely a difference between an amplitude of the second useful signal components of the second and fourth vibration signals, based on the second and fourth vibration signals received in the second operating mode, namely, for example, to compare them with at least one reference value representing a reduced functionality or a defect of the transducer or, in the case of a deviation that is too large, namely that exceeds a reference value predefined for this purpose, to output a message declared, for example, as a (fault) alarm.

According to a seventeenth embodiment of the invention, it is further provided that the measuring system electronics unit is configured to determine a second (test) phase difference, namely a difference between a phase angle of the second useful signal components of the second and fourth vibration signals, based on the second and fourth vibration signals received in the second operating mode, for example namely to compare them with at least one reference value representing a reduced functionality or a defect of the transducer or, in the case of a deviation that is too large, namely that exceeds a reference value predefined for this purpose, to output a message declared, for example, as a (fault) alarm.

According to an eighteenth embodiment of the invention, it is further provided that the fault of the measuring system comprises a change, for example an irreversible change, in one or more vibration characteristics of the tube assembly, for example due to a reduction in a wall thickness of the tube wall of one or more of the tubes and/or due to a plastic deformation of one or more of the tubes and/or due to deposits on an inner side of the tube wall of one or more of the tubes and/or due to a crack in the tube wall of one or more of the tubes.

According to a nineteenth embodiment of the invention, it is further provided that the fault of the measuring system comprises a change, for example an irreversible change, in one or more flow characteristics of the tube assembly, for example due to a reduction in a flow cross-section of the tube assembly, for example as a result of a blockage of one or more of the tubes and/or as a result of deposits on an inner side of the tube wall of one or more of the tubes.

According to a twentieth embodiment of the invention, it is further provided that the fault of the measuring system comprises a change, for example an irreversible change, in one or more electro-mechanical transducer properties, for example due to aging of one or more of the vibration sensors and/or vibration exciters and/or due to a change in a respective mechanical connection between one or more vibration sensors and/or one or more vibration exciters and the respective tube.

According to a twenty-first embodiment of the invention, it is further provided that the fault of the measuring system comprises a faulty installation and/or assembly of the transducer or the measuring system formed therewith.

According to a twenty-second embodiment of the invention, it is further provided that the tube assembly has a first coupler element, for example a coupler element that is plate-shaped, for example positioned further away from the second flow divider than from the first flow divider, mechanically connected to each of the tubes, and a second coupler element, for example a coupler element that is plate-shaped and/or structurally identical to the first coupler element, for example positioned further away from the first flow divider than from the second flow divider, mechanically connected to each of the tubes.

According to a twenty-third embodiment of the invention, it is further provided that the transducer has a natural bending vibration mode, for example a fundamental bending vibration mode, in which the first and second tubes can or do perform out-of-phase mechanical vibrations, and wherein the measuring system electronics unit is configured, in the first mode of operation, to feed first and second drive signals, forcing out-of-phase mechanical vibrations, to the first or second tubes, for example namely to provide the first and second useful current components at a (alternating current) frequency, which deviates from a resonance frequency, fr12, of the bending vibration mode by less than 1% of the same resonance frequency and/or by less than 1 Hz.

According to a twenty-fourth embodiment of the invention, it is further provided that the first vibration exciter is configured to convert electrical power with a time-varying electrical current into mechanical power in such a way that a time-varying driving force acts on the first tube at a point of application formed by means of the first vibration exciter on the first tube mechanically connected thereto.

According to a twenty-fifth embodiment of the invention, it is further provided that the second vibration exciter is configured to convert electrical power with a time-varying electrical current into mechanical power in such a way that a time-varying driving force acts on the second tube at a point of application formed by means of the second vibration exciter on the second tube mechanically connected thereto.

According to a twenty-sixth embodiment of the invention, it is further provided that the first vibration exciter is not mechanically connected to the second tube.

According to a twenty-seventh embodiment of the invention, it is further provided that the first vibration exciter has no component mechanically connected to the second tube.

According to a twenty-eighth embodiment of the invention, it is further provided that the second vibration exciter is not mechanically connected to the first tube.

According to a twenty-ninth embodiment of the invention, it is further provided that the second vibration exciter has no component mechanically connected to the first tube.

According to a thirtieth embodiment of the invention, it is further provided that, apart from the first vibration exciter mechanically connected to the first tube, the exciter assembly does not include any vibration exciter.

According to a thirty-first embodiment of the invention, it is further provided that, apart from the second vibration exciter mechanically connected to the second tube, the exciter assembly does not include any vibration exciter.

According to a first further development of the invention, both the first flow divider and the second flow divider in each case have, for example exactly, four flow openings, and the tube assembly has a third tube, for example curved at least in sections and/or straight at least in sections and/or parallel at least in sections to the first tube, and a fourth tube, for example curved at least in sections and/or straight at least in sections and/or structurally identical to the third tube and/or parallel at least in sections to the third tube, wherein each of the third and fourth tubes of the tube assembly in each case extends from a respective first end of the respective tube to a respective second end of said tube with a respective tube length and each comprises a lumen enclosed by a tube wall, for example a metallic tube wall, in each case extending from the respective first end of the respective tube to the respective second end of said tube, and wherein each of the third and fourth tubes of the tube assembly is each case connected to each of the first and second flow dividers in such a way that the third tube opens with its first end into a third flow opening of the first flow divider and with its second end into a third flow opening of the second flow divider and the fourth tube opens with its first end into a fourth flow opening of the first flow divider and with its second end into a fourth flow opening of the second flow divider, and in that each of the third and fourth tubes of the tube assembly is configured to be traversed by the measured substance and to be vibrated in the meantime. According to a first embodiment of the first further development of the invention, it is further provided that the third and fourth tubes of the tube assembly are mechanically coupled to one another at least via the first and second flow dividers, in such a way that forced mechanical vibrations of the third tube cause mechanical vibrations of the fourth tube coupled thereto and forced mechanical vibrations of the fourth tube cause mechanical vibrations of the third tube coupled thereto, and/or that forced mechanical vibrations of the first and third tubes, for example opposing bending vibrations of the first and third tubes, mechanical vibrations of each of the second and fourth tubes coupled thereto, for example opposing bending vibrations of the second and fourth tubes, and forced mechanical vibrations of the second and fourth tubes, for example opposing bending vibrations of the second and fourth tubes, cause coupled mechanical vibrations of each of the first and third tubes coupled thereto, for example opposing bending vibrations of the first and third tubes, and/or in that forced mechanical vibrations of each of the first, second, third and fourth tubes in each case cause coupled mechanical vibrations of each of the other first, second, third or fourth tubes. The first vibration exciter may be further configured to excite mechanical vibrations of the first and third tubes, for example differentially, and the second vibration exciter may be configured to excite mechanical vibrations of the second and fourth tubes, for example differentially.

According to a second embodiment of the first further development of the invention, it is further provided that the first vibration exciter is mechanically connected to both the first tube and the third tube, and that the second vibration exciter is mechanically connected to both the second tube and the fourth tube.

According to a third embodiment of the first further development of the invention, it is further provided that each of the first and second vibration sensors is in each case configured to detect, for example differentially, vibration movements of the first and third tubes, in such a way that each of the first and second vibration signals represents, for example out-of-phase, vibration movements of the first and third tubes;

and wherein each of the third and fourth vibration sensors is in each case configured to detect vibration movements of the second and fourth tubes, for example differentially, in such a way that each of the third and fourth vibration signals represents, for example out-of-phase, vibration movements of the second and fourth tubes.

According to a fourth embodiment of the first further development of the invention, it is further provided that the first and second vibration sensors are in each case mechanically connected to both the first tube and the third tube, and that the third and fourth vibration sensors are each mechanically connected to both the second tube and the fourth tube.

According to a fifth embodiment of the first further development of the invention, it is further provided that the first, second, third and fourth tubes are structurally identical only in pairs, for example in such a way that the first tube is structurally identical only to the third tube and that the second tube is structurally identical only to the fourth tube.

According to a sixth embodiment of the first further development of the invention, it is further provided that each of the four tubes has a caliber that is equal to a caliber of each of the other tubes. According to a seventh embodiment of the first further development of the invention, it is further provided that the tube wall of each of the four tubes has a wall thickness that is equal to a wall thickness of each of the other tubes.

According to a second further development of the invention, the measuring system further comprises a support frame, for example in the form of a transducer protective housing, wherein the support frame and the tube assembly are fastened to one another, for example detachably, by means of their first and second flow dividers.

According to a first embodiment of the second further development of the invention, it is further provided that the first and second vibration exciters are mechanically connected to the support frame.

According to a second embodiment of the second further development of the invention, it is further provided that the first, second, third and fourth vibration sensors are mechanically connected to the support frame.

According to a third further development of the invention, the measuring system further comprises an electronics protective housing for the measuring system electronics unit, for example fastened to a support frame of the transducer.

A basic idea of the invention consists of using the sensitivity of parallel vibration modes inherent in vibration-type transducers to changes in the transducer in order to monitor the functioning of the vibronic measuring system formed with it or to be able to detect a possible fault of the measuring system at an early stage based on changes in the vibration characteristics of at least one of the parallel vibration modes, for example also merely with "on-board" means.

BRIEF DESCRIPTION OF THE DRAWINGS

The invention as well as advantageous embodiments thereof are explained in more detail below based upon exemplary embodiments shown in the figures of the drawing. Identical or identically acting or identically functioning parts are provided with the same reference signs in all figures; for reasons of clarity or if it appears sensible for other reasons, reference signs mentioned before are dispensed with in subsequent figures. Further advantageous embodiments or developments, especially, combinations of partial aspects of the invention that were initially explained only separately, furthermore emerge from the figures of the drawing and/or from the claims themselves.

In the figures in detail.

DETAILED DESCRIPTION

Figure 1:
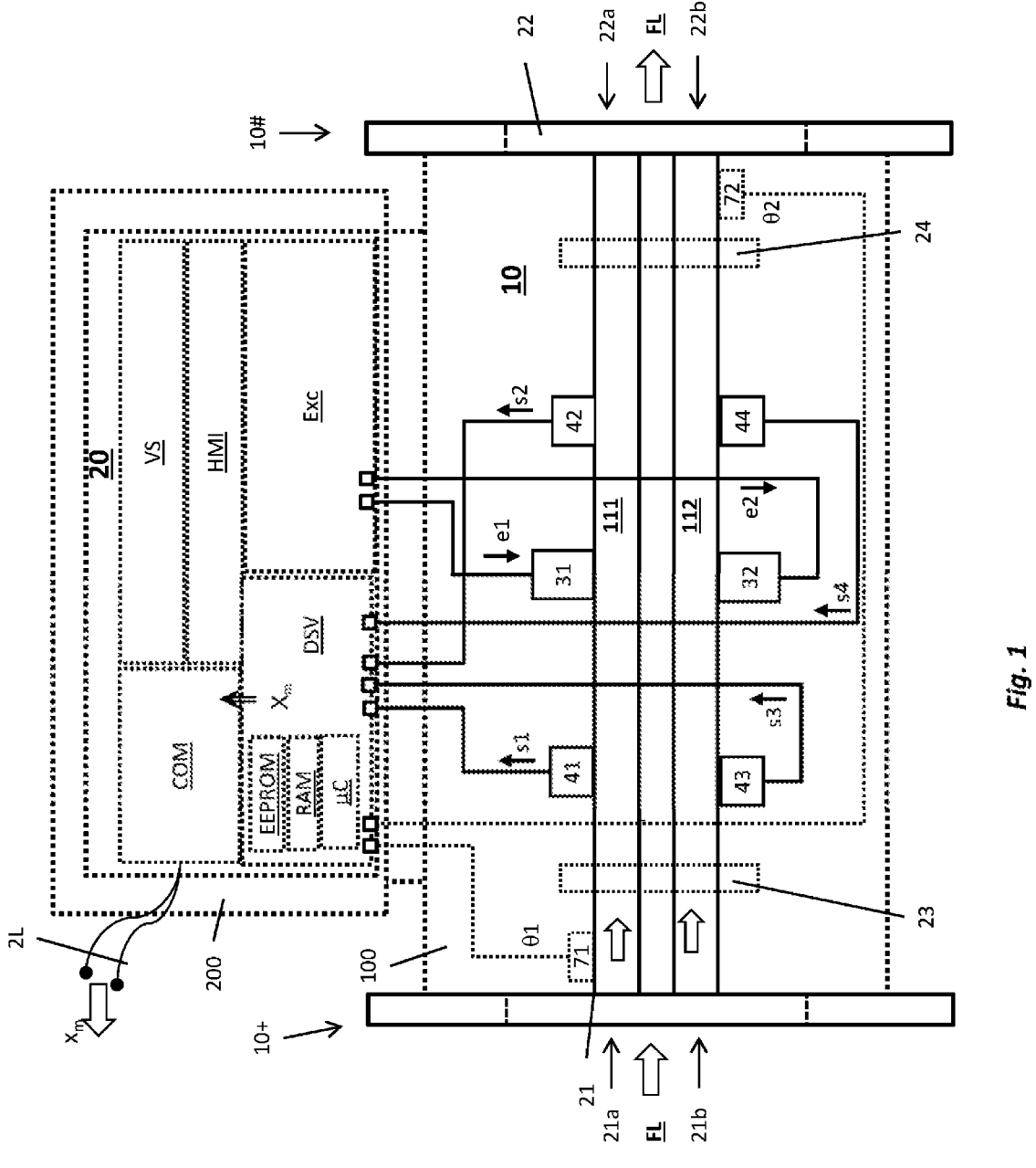
FIG. 1 schematically shows an exemplary embodiment of a measuring system according to the present disclosure.
Figure 2:
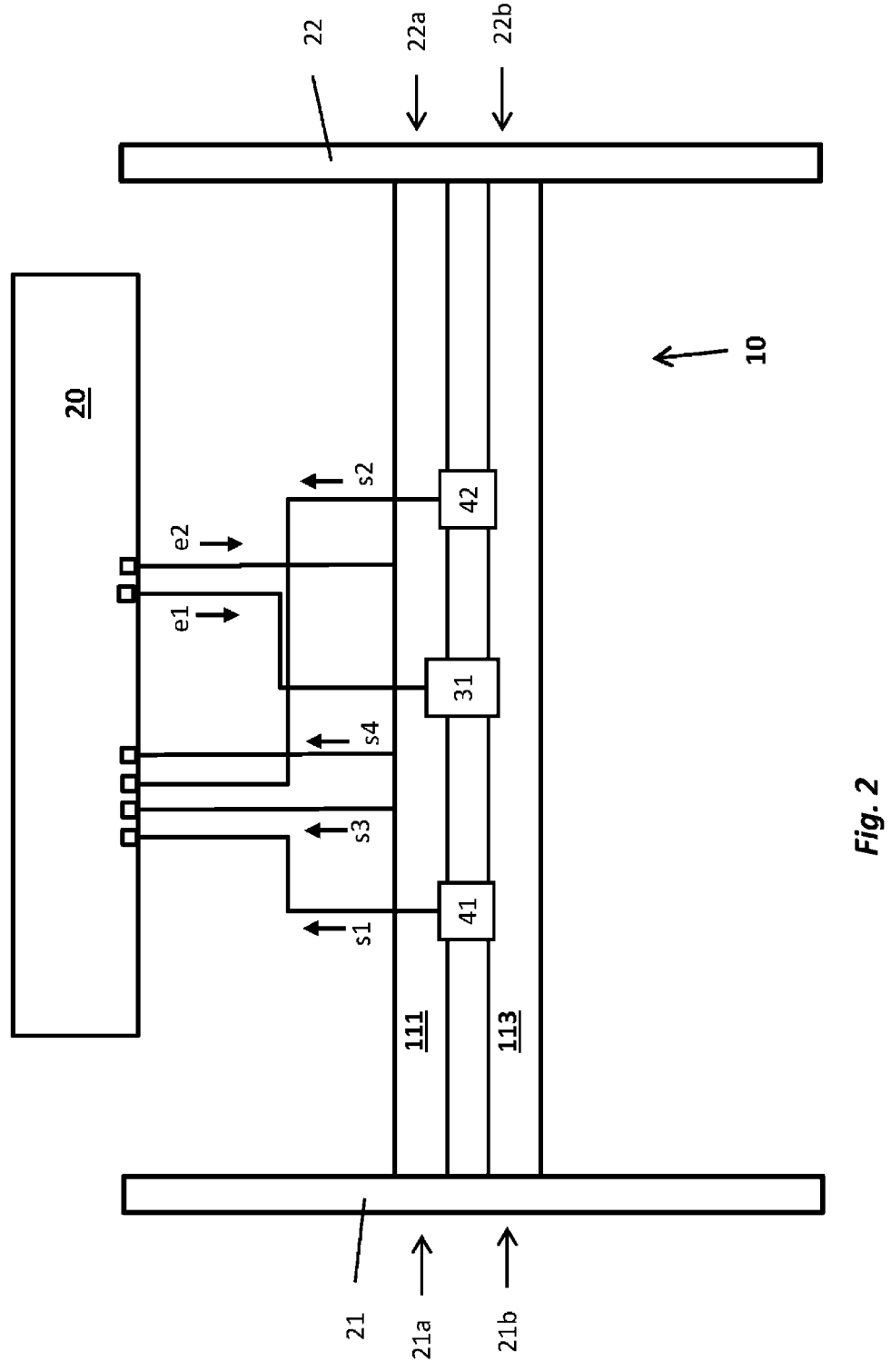
FIGS. 2, 3 schematically show a further variant for a measuring system according to the present disclosure.
Figure 3:
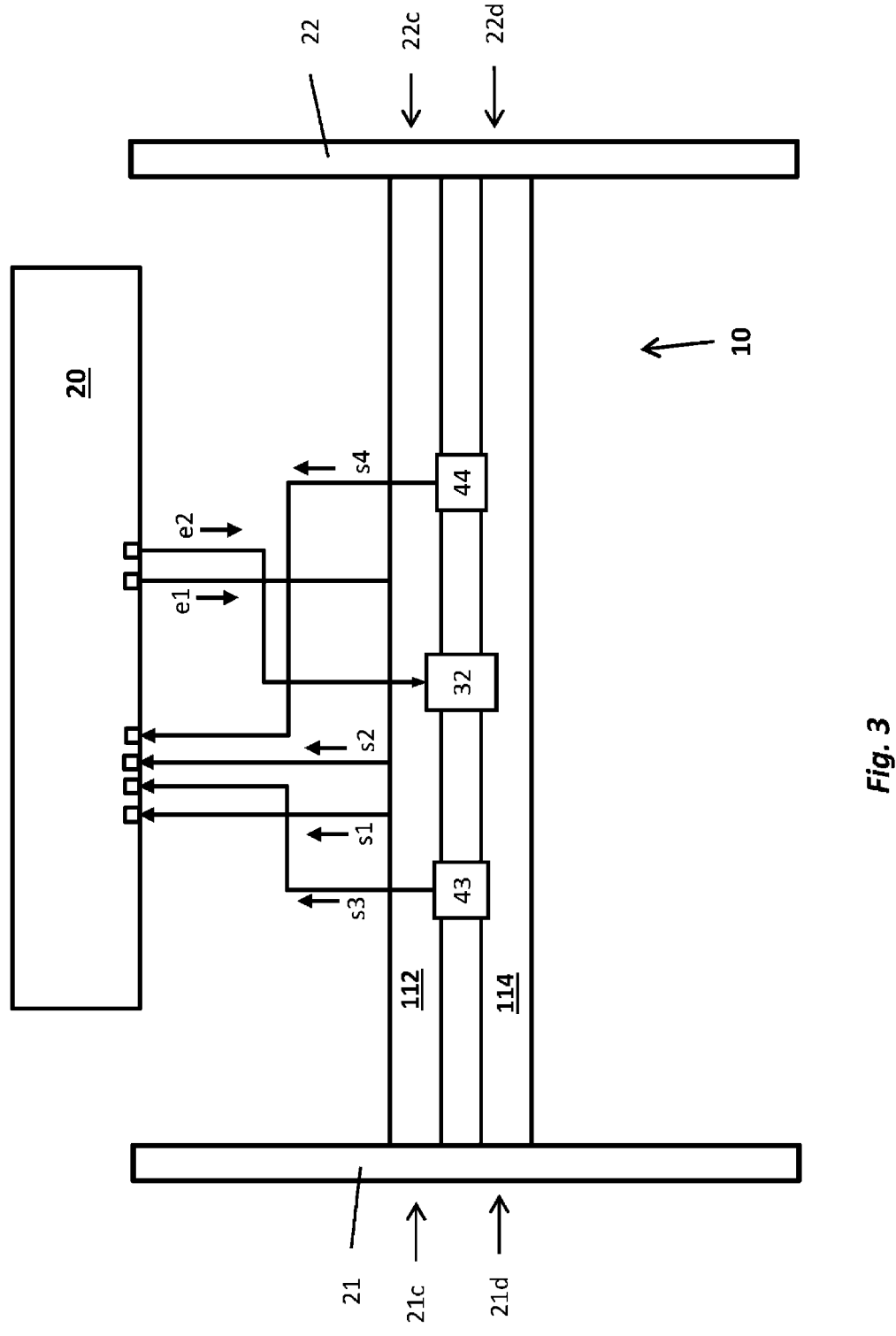

FIG. 1 or 2 and 3 schematically show exemplary embodiments or embodiment variants for a vibronic measuring system for measuring and/or monitoring at least one, especially time-varying, measured variable of an at least intermittently flowing, for example at least intermittently two-phase or multi-phase or inhomogeneous (fluid) measured substance FL, wherein the measured variable can, for example, be a flow parameter, such as a mass flow m, a volumetric flow and/or a flow rate, or, for example, a substance parameter, such as a density p and/or a viscosity, of the measured substance FL. In particular, the measuring system is especially provided or configured to be integrated into the course of a process line system conducting a fluid FL used as a measured substance, for example, a gas, a liquid or a dispersion, and to be at least intermittently traversed during operation by the measured substance FL, which is fed in and discharged again, for example, via a process line. Moreover, the measuring system is provided to determine, i.e., especially to calculate and/or output, measured values $X_M$, and optionally also digital measured values, (chronologically successively) quantifying the at least one physical measured variable. The process line may, for example, be a tube line, i.e., for example, a tube line of a filling plant, a refueling device or another industrial plant.

As shown respectively in FIGS. 1, 2 and 3, or as is readily apparent from their combination, the measuring system comprises a vibration-type transducer 10, i.e., a transducer with a tube assembly formed by means of at least two, for example by means of exactly two or exactly four—for example at least in pairs of identical construction—tubes (111, 121, 112, 122), an exciter assembly (31, 32) for converting electrical power to excite and maintain forced mechanical vibrations of the tubes, and a sensor assembly (41, 42, 43, 44) for detecting mechanical vibrations of the tube assembly and for providing vibration signals (s1, s2, s3, s4), respectively representing vibration movements of the tube assembly, i.e., especially of tubes thereof, for example electrical or optical. As is quite common with transducers of this type, the tube assembly may further have two flow dividers (21, 22), in each case (fluidically) connected to the at least two tubes.

The transducer MW is furthermore also provided to be connected to the aforementioned process line system via an inlet end 10+, formed for example by one of the aforementioned flow dividers and/or also enclosed by a connection flange, and an outlet end 10 #, formed for example by the other of the aforementioned flow dividers and/or enclosed by a connection flange, and through which the measured substance FL flows during operation. In addition, each of the tubes of its tube assembly is furthermore in each case configured to conduct in its respective lumens in each case a partial volume of the measured substance FL and meanwhile to be allowed to vibrate, for example namely in each case to carry out forced mechanical vibrations about a respective associated static rest position, in particular bringing about a measurement effect corresponding to the at least one measured variable and/or excited by means of the exciter assembly; this especially in such a way that each of the tubes of the tube assembly is allowed to vibrate and, starting from its respective first end in the direction of its respective second end, is meanwhile traversed by fluid. As quite common in the transducers of the type discussed, the aforementioned forced mechanical vibrations can at least proportionately be forced bending vibrations of the tubes about a respective imaginary vibration axis of the tube assembly, namely one imaginarily intersecting the respective tube; this specifically also such that the aforementioned (two or four) imaginary vibration axes are substantially parallel to one another, for example when the tubes are in the static rest position. In addition to the transducer 10, the measuring system further comprises measuring system electronics unit 20 electrically coupled therewith, i.e., both to the aforementioned exciter assembly of the transducer and to the aforementioned sensor assembly of the transducer, i.e., for example, by means of corresponding electrical connecting lines, especially, formed by means of at least one microprocessor (µC) and/or arranged in an electronics protective housing (200) and/or used as a transmitter for controlling the transducer, i.e., especially to cause the aforementioned mechanical vibrations of the tubes and to evaluate vibration signals supplied by the transducer, i.e., for example, to determine the aforementioned measured values.

Figure 4:
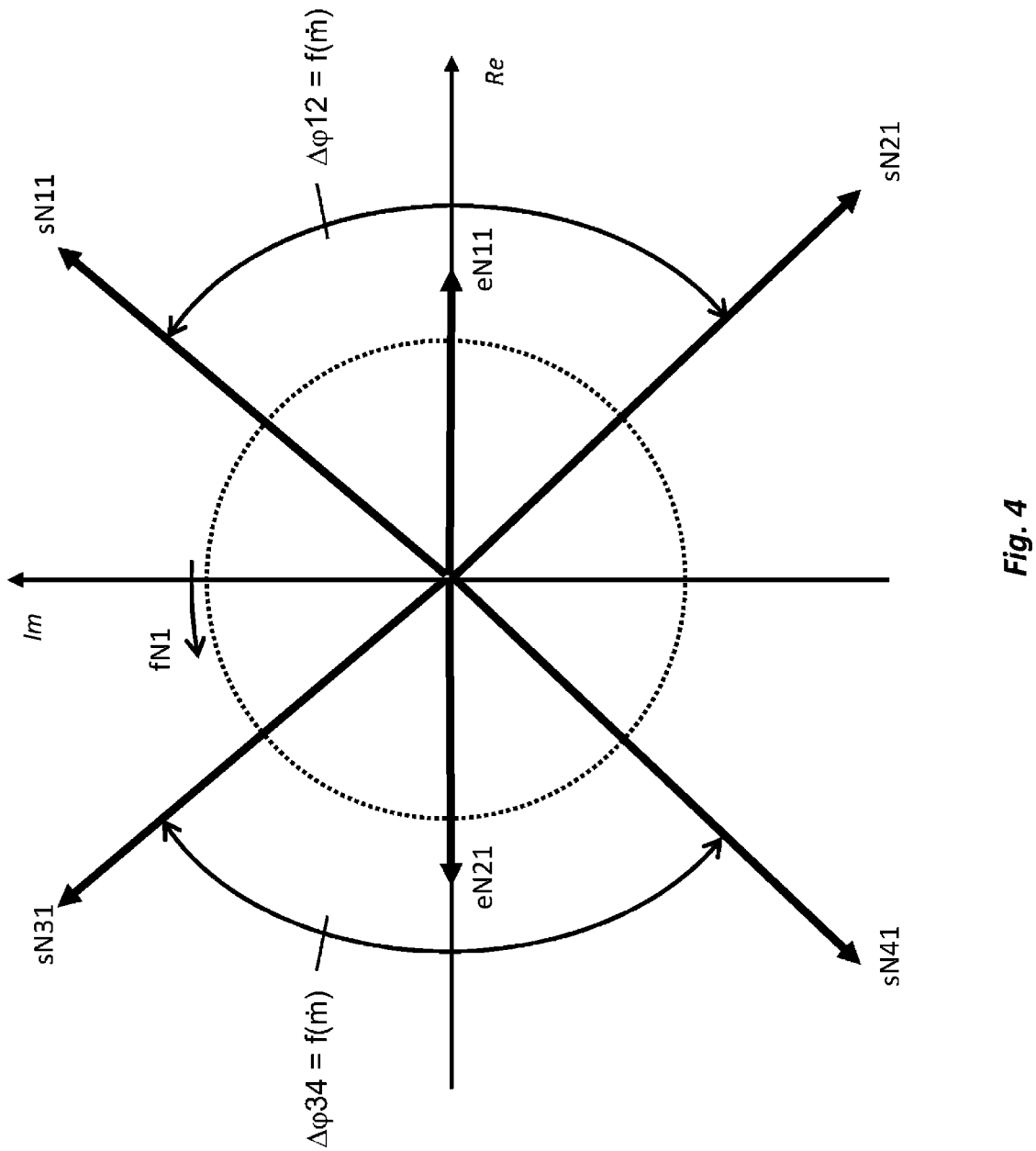
FIGS. 4, 5 show pointer diagrams for driver and vibration signals generated during operation of a measuring system according to FIG. 1 or according to FIGS. 2 and 3.

The aforementioned exciter assembly of the transducer 10 is in particular provided or configured to convert electrical power fed thereto (from the measuring system electronics unit 20) into mechanical power in such a way that the tube assembly, in particular each of its tubes at least intermittently, performs forced mechanical vibrations about a static rest position, while the sensor assembly is provided or configured to detect mechanical vibrations of the tube assembly, not least mechanical vibrations forced by means of the exciter assembly and/or bending vibrations of the tubes, and to provide a first vibration signal s1, a second vibration signal s2, a third vibration signal s3 and a fourth vibration signal s4, of which—for example electrical—vibration signals s1, s2, s3, s4 each at least proportionally represents vibration movements of one or more of the tubes of the tube assembly, for example in each case by means of a respective variable electrical voltage corresponding to vibration movements of the tubes; this in particular in such a way that—as indicated in FIG. 4—the vibration signals s1, s2 (or in each case a spectral signal component sN1 or sN2 thereof) follow a change in a mass flow of the measured substance conducted in the tube assembly with a change in a first phase difference $\Delta\varphi12$, namely a change in a difference between a phase angle of the vibration signal s1 and a phase angle of the vibration signal s2, and that the vibration signals s3, s4 (or in each case a spectral signal component sN3 and sN4 thereof) follow a change in a mass flow of the measured substance conducted in the tube assembly with a change in a second phase difference $\Delta\varphi34$, namely a change in a difference between a phase angle of the vibration signal s3 and a phase angle of the vibration signal s4, and/or in such a way that each of the aforementioned vibration signals s1, s2, s3, s4 follows a change in a density of the measured substance conducted in the tube assembly in each case with a change in a respective signal frequency of at least one spectral signal component.

According to a further embodiment of the invention, the tube assembly has, as already indicated, a first flow divider 21 with at least two flow openings (21a, 21b), used, for example, as a line-branching unit and/or on the inlet side, a second flow divider 22 with at least two flow openings (22a, 22b), which is, for example, structurally identical to the first flow divider 21 and/or is used as a line-merging unit and/or is on the outlet side, along with a first tube 111, especially, curved at least in sections and/or straight at least in sections, and a second tube 112, for example curved at least in sections and/or straight at least in sections and/or structurally identical to the first tube and/or parallel to the first tube at least in sections. Each of the tubes 111, 112 in each case extends from a respective first end of the respective tube to a respective second end of said tube with a respective tube length and in each case has a lumen enclosed by a tube wall, for example a metallic tube wall, and extending in each case from the respective first end of the respective tube to the respective second end of said tube. Each of the tubes 111, 112 of the tube assembly is connected to each of the flow dividers 21, 22 in each case, in such a way that the tube 111 opens with its first end into a first flow opening 21a of the flow divider 21 and with its second end into a first flow opening 22a of the flow divider 22 and the tube 112 opens with its first end into a second flow opening 21b of the flow divider 21 and with its second end into a second flow opening 22b of the flow divider 22. In addition to the tubes 111, 112, the tube assembly may have further tubes, for example—as also indicated in FIG. 3 or apparent from a combination of FIGS. 2 and 3—a further two tubes, i.e., as also shown, among other things, in the aforementioned US-A 56 02 345, WO-A 96/08697, US-A 2017/0356777, WO-A 2019/081169, WO-A 2019/081170 or also the international patent application PCT/EP2020/084119, a total of four tubes. Accordingly, according to a further embodiment of the invention, both the flow divider 21 and the flow divider 22 in each case have, especially exactly, four flow openings and the tube assembly has a third tube 113, which is curved, especially at least in sections, and/or is straight at least in sections and/or is parallel to the tube 111 at least in sections, and a fourth tube 114, which is curved, especially at least in sections, and/or is straight at least in sections and/or is structurally identical to the tube 113 and/or is parallel to the tube 113 at least in sections. Each of the aforementioned tubes 113, 114 of the tube assembly also extends in each case from a respective first end of said tube to a respective second end of said tube with a respective tube length and has in each case a lumen enclosed by a tube wall, for example a metallic tube wall, extending in each case from the respective first end of the respective tube to the respective second end of said tube. Moreover, each of the tubes 113, 114 is connected to each of the flow dividers 21, 22 in each case, in such a way that the tube 113 opens with its first end into a third flow opening 21c of the flow divider 21 and with its second end into a third flow opening of the flow divider 22 and the tube 114 opens with its first end into a fourth flow opening 21d of the flow divider 21 and with its second end into a fourth flow opening 22d of the flow divider 22; in particular in such a way that the tube assembly has exactly four tubes, i.e., apart from the aforementioned tubes 111, 112, 121, 122, no further tube connected to the flow divider 21 and the flow divider 22.

For the mentioned case that the tubes of the tube assembly are curved, the aforementioned tube length corresponds to a stretched length or a length of an imaginary center line of the respective tube. The tube length of the tube 111 is preferably equal to the tube length of the tube 112. In the case of a tube assembly with four tubes, the tube length of the tube 113 is preferably equal to the tube length of the tube 1114; for example, also in such a way that the tube length of the tube 111 is only equal to the tube length of the tube 112, but greater than the tube length of both the tube 113 and the tube 114, or the tube length of the tube 113 is only equal to the tube length of the tube 114, but less than the tube length of both tube 111 and the tube 112. According to a further embodiment of the invention, the tube wall of each of the tubes of the tube assembly has in each case a predefined—for example also substantially uniform—wall thickness and may—as is quite usual with tube assemblies of the type in question or transducers or measuring systems formed therewith—consist for example of the same material and/or a metal, in particular in each case a stainless steel or in each case a nickel-based alloy; this for example also in such a way that the tube wall of each of the tubes of the tube assembly has a wall thickness that is equal to a wall thickness of the other tube or each of the other tubes, and/or that each of the tubes of the tube assembly has a caliber, i.e., an inner diameter, which is equal to a caliber of the other tube or each of the other tubes. According to a further embodiment of the invention, each of the tubes has a respective caliber that is not less than 1 mm, for example also more than 10 mm in each case, and/or the tube wall of each of the tubes has a respective smallest wall thickness that is not less than 0.5 mm, for example also more than 1.5 mm, and/or that is equal to the smallest wall thickness of the tube wall of each of the other of the tubes. Moreover, the tubes of the tube assembly may, for example in each case be formed in one piece, namely, for example, be produced seamlessly or, at least in the case of a tube wall made of metal, be produced with a welded seam, and/or can in each case be formed by bending a tubular semi-finished product, for example in such a way that each of the tubes is substantially V-shaped or has a V-shaped silhouette, and/or that each of the tubes ultimately has a tube shape lying in a single (bending) plane. In the aforementioned case in which the tube assembly has four tubes, the tubes may, for example, also be designed in such a way that they are only structurally identical in pairs, for example in such a way that the tube 111 is only structurally identical to the tube 112 and that the tube 113 is only structurally identical to the tube 114.

For adjusting mechanical vibration characteristics of the tube assembly, not least for tuning one or more resonance frequencies of its tubes, the tube assembly, as also indicated in FIG. 1, may furthermore have a first coupler element 23, positioned in particular further away from the flow divider 22 than from the flow divider 21, mechanically connected to each of its tubes, for example in the form of a plate, and at least one second coupler element 24, positioned in particular further away from the flow divider 21 than from the flow divider 22, mechanically connected to each of its tubes, for example in the form of a plate and/or structurally identical to the coupler element 23. For connecting the tube assembly or the transducer or measuring system formed therewith to the aforementioned process line conducting the measured substance FL, the flow divider 21 may also have a first connecting flange, for example used to connect the tube assembly to a line segment of said process line supplying the fluid FL during operation, and the flow divider 22 may have a second connecting flange, for example used to connect the tube assembly to a line segment of the process line discharging the fluid FL again. On each of the aforementioned connecting flanges, a sealing surface for fluid-tight or leak-free connection of the tube assembly to the respectively corresponding line segment of the process line can, for example, be respectively formed.

According to a further embodiment of the invention, the measuring system also has a support frame 100, especially a bending- and/or torsion-resistant support frame, wherein, as also shown schematically in FIG. 1, said support frame 100 and the tube assembly are fastened to one another, for example detachably, by means of their flow dividers 21, 21. In order to protect the transducer or its components from harmful environmental influences, to avoid undesirable sound emissions by the vibrating tubes or to collect measured substance escaping from a leaking tube assembly, as quite common with vibronic measuring systems of the type in question, the aforementioned support frame 100 can also be designed as a transducer protective housing enclosing the tubes 111, 112 of the tube assembly, for example also in such a way that said transducer protective housing has a compressive strength that is greater than a maximum compressive strength of the tubes of the tube assembly and/or that is more than 50 bar.

With the measuring system according to the invention, as already mentioned, each of the tubes of the tube assembly, i.e., each of the tubes 111, 112 and possibly also of the tubes 113, 114 in particular, is configured to be traversed by the measured substance FL (or a partial volume thereof) and to be vibrated during this process. For this purpose, the exciter assembly in the measuring system according to the invention has two, for example electrodynamic and/or mutually identical, vibration exciters 31, 32, of which a first vibration exciter 31, for example electrodynamic or piezoelectric, is mechanically connected to the tube 112 (but not to the tube 112), for example is positioned centrally on the tube 111, especially, namely has no (exciter) component mechanically connected to the tube 112, and of which a second vibration exciter 32, for example an electrodynamic or piezoelectric one, is mechanically connected to the tube 112 (although not to the tube 111), for example namely positioned centrally on the tube 112, especially, namely has no (exciter) component mechanically connected to the tube 111. Each of the vibration exciters 31, 32 is also configured in each case to convert electrical power with a time-varying electrical current into mechanical power, in particular in such a way that a time-varying driving force acts on the respective tube at a respective point of application, namely formed by means of the respective vibration exciter on the respective tube mechanically connected thereto. According to a further embodiment of the invention, it is further provided that the exciter assembly does not have any vibration exciter other than the vibration exciter 31 mechanically connected to the tube 111 and/or that the exciter assembly does not comprise any vibration exciter other than the vibration exciter 32 mechanically connected to the tube 112.

According to a further embodiment of the invention, in the aforementioned case where the tube assembly comprises four tubes, the vibration exciter 31 is configured to excite mechanical vibrations of the two tubes 111, 113 and the vibration exciter 32 is configured to excite mechanical vibrations of the other two tubes 112, 114; this especially in such a way that the vibration exciter 31 acts differentially on the two tubes 111, 113, namely can only introduce opposing excitation forces into the two tubes 111, 113, and that the vibration exciter 32 acts differentially on the two tubes 112, 114, namely can only introduce opposing excitation forces into the two tubes 112, 114. For this purpose, the vibration exciter 31 may, for example, be mechanically connected to both the tube 111 and the tube 113, and the vibration exciter 32 may correspondingly be mechanically connected to both the tube 112 and the tube 114, for example namely in such a way that the aforementioned respective driving force acts on both the tube 111 and the tube 113 or on both the tube 112 and the tube 114. Last but not least, for the other case that the measuring system comprises the aforementioned support frame and the tube assembly comprises exactly two tubes, the vibration exciters 31, 32 may be mechanically connected, for example proportionally, to the support frame 100, for example in such a way that the aforementioned respective driving force acts on both the tube 111 or the tube 112, and in each case on the support frame.

For generating the aforementioned vibration signals s1, s2, s3, s4, the sensor assembly has at least four vibration sensors, for example structurally identical to and/or spaced apart from one another, of which a first vibration sensor 41, for example electrodynamic or optical, and a second vibration sensor 42 are positioned on the tube 111 spaced apart from one another, for example also symmetrically to the vibration exciter 31, and of which a third vibration sensor 43, for example electrodynamic or optical, and a fourth vibration sensor 44, for example electrodynamic or optical, are positioned on the tube 112 spaced apart from one another, especially, symmetrically to the vibration exciter 32. Each of the vibration sensors 41, 42 is in each case configured to detect vibration movements of the tube 111 and to convert them accordingly into the aforementioned vibration signal s1 and the aforementioned vibration signal s2, and each of the vibration sensors 41, 42 is in each case configured to detect vibration movements of the tube 112 and to convert them accordingly into the aforementioned vibration signal s3 and the aforementioned vibration signal s4; this especially in such a way that each vibration signal s1, s2, s3, s4 represents the corresponding vibration movements or that each of the vibration signals s1, s2, s3, s4 in each case contains one or more sinusoidal signal components, in each case having a frequency corresponding to a vibration frequency of vibration movements of the respective tube 111 or 112. As also indicated in FIG. 1 or readily apparent from a combination of FIGS. 1, 2 and 3, the vibration sensors 41, 42, 43, 44 can also be positioned, for example, in such a way that the vibration sensor 41 and the vibration sensor 43 in each case detect inlet-side vibration movements of the tube 111 and that the vibration sensor 42 and the vibration sensor 44 in each case detect outlet-side vibration movements of the tube 112.

In addition, the vibration sensors may also be positioned, for example, in such a way that the vibration sensor 41 is at the same distance from the aforementioned flow divider 21 as the vibration sensor 42 is from the aforementioned flow divider 22 and/or that the vibration sensor 43 is at the same distance from the aforementioned flow divider 21 as the vibration sensor 44 is from the aforementioned flow divider 22, and/or in such a way that the two vibration sensors 41, 42 are in each case positioned equidistantly from the aforementioned vibration exciter 31 and/or the two vibration sensors 43, 44 are in each case positioned equidistantly from the aforementioned vibration exciter 32.

Last but not least, in the aforementioned case that the vibration sensors are electrodynamic vibration sensors, i.e., vibration sensors constructed in the manner of a vibrating or plunger coil, it is provided according to a further embodiment of the invention that both the vibration sensor 41 and the vibration sensor 42 are at least proportionately mechanically connected at least to the tube 111, especially but not to the tube 112, and that both the vibration sensor 43 and the vibration sensor 44 are at least proportionately mechanically connected at least to the tube 112, especially but not to the tube 111. In the other case, in which the measuring system has a support frame and the tube assembly comprises exactly two tubes, the vibration sensors may accordingly also be proportionally connected to the support frame mechanically; for example, in such a way that the vibration sensors 41, 42, 43, and 44 in each case detect vibration movements of the tubes 111 or 112, relative to the support frame. For this purpose, the vibration sensors 51, 52 may in each case be mechanically connected to both the tube 111 and the support frame, and the vibration sensors 53, 54 may in each case be mechanically connected to both the tube 112 and the support frame. In the other aforementioned case in which the tube assembly has four tubes, both the vibration sensor 41 and the vibration sensor 42 may be mechanically connected to each of the two tubes 111, 113, as also indicated in FIGS. 2 and 3 or readily apparent from their combination, and both the vibration sensor 43 and the vibration sensor 44 may be mechanically connected to each of the tubes 112, 114, for example, in such a way the vibration sensor 41 and the vibration sensor 43 in each case detect inlet-side vibration motions of the tubes 111, 112, 113 or 114, and that the vibration sensor 42 and the vibration sensor 44 in each case detect outlet-side vibration motions of the tubes 111, 112, 113 or 114. In addition, the vibration sensors 41, 42 may be configured for this case to detect opposite, i.e., out-of-phase, possibly also opposing vibration movements of the tubes 111, 1113 and to convert them into the respective vibration signal s41, s42 (representing the same vibration movements in each case), and accordingly each of the aforementioned vibration sensors 43, 44 may also be configured to detect opposite, i.e., out-of-phase, possibly also opposing vibration movements of the tubes 112, 114 and to convert them into the respective vibration signal (representing the same vibration movements in each case); this for example also in such a way that the vibration sensors 41, 42 are configured to detect the vibration movements of the two tubes 111, 113 differentially, namely to convert only opposite vibration movements of the same tubes 111, 113 into the respective vibration signal s1, s2, and that the vibration sensors 43, 44 are configured to detect the vibration movements of the two tubes 112, 114 differentially, namely to convert only opposite vibration movements of the same tubes 112, 114 into the respective vibration signal s3, s4. For this purpose, the vibration sensors 51, 52 may in each case be mechanically connected to both the tube 111 and the tube 113, and the vibration sensors 53, 54 may in each case be mechanically connected to both the tube 112 and the tube 114.

In order to further improve the accuracy with which the measured values $X_M$ are determined, the transducer, as also shown schematically in FIG. 1, may further also have temperature sensors 71, 72 that are used to detect temperatures within the tube assembly and to provide corresponding temperature measurement signals $\theta 1$, $\theta 2$, for example in each case directly attached to one of the tubes of the tube assembly and/or a strain sensor for detecting mechanical stresses within the tube assembly and providing corresponding strain measurement signals, for example, in each case directly attached to one of the tubes of the tube assembly.

As already mentioned, the measuring system comprises, in addition to the transducer 10, a measuring system electronics unit 20 electrically coupled to the exciter assembly of the transducer and to the sensor assembly thereof. The measuring system electronics unit 20 may, for example, be designed to be programmable and/or remotely parameterizable, i.e., for example, correspondingly formed by means of at least one microprocessor and/or at least one digital signal processor (DSP) and/or by means of a programmable logic component (FPGA) and/or by means of a customer-specifically programmed logic module (ASIC). Furthermore, the measuring system electronics unit 20 can be supplied with the electrical energy required during operation by means of internal energy stores and/or from outside the measuring system electronics unit 20 via a connecting cable. The electrical coupling or connection of the transducer 10 to the measuring system electronics unit 20 may take place by means of corresponding electric connecting lines and corresponding cable feedthroughs. In this case, the connecting lines can be formed at least partially as electric conductor wires sheathed at least in some sections by electric insulation, for example in the form of "twisted pair" lines, ribbon cables, and/or coaxial cables. As an alternative or in addition thereto, the connecting lines can also be formed at least in some sections by means of printed conductors of a printed circuit board, especially a flexible, optionally varnished printed circuit board. The measuring system electronics unit 20 may furthermore, as also schematically shown in FIG. 1, be accommodated, for example, in a corresponding electronics housing 200 of its own, which is especially impact-resistant and/or also explosion-resistant and/or at least protects against spray water, and may be designed in such a way that, during operation of the measuring system, it may exchange measuring and/or other operating data, for example also status messages, with a superordinate electronic data processing system (not shown here), for example a programmable logic controller (PLC), a personal computer and/or a workstation, via a data transmission system, for example a field bus system and/or wirelessly by radio, such as current measured values or setting and/or diagnostic values used to control the measuring system. Accordingly, the measuring system electronics unit 20 may, for example, have such a transmitting and receiving circuit COM, which is fed during operation by a (central) evaluation and supply unit provided in the aforementioned data processing system and remote from the measuring system. For example, the measuring system electronics unit 20 (or its aforementioned transmitting and receiving electronics COM) may moreover be designed such that it can be connected electrically to the aforementioned external electronic data processing system via a two-conductor connection 2L, optionally also configured as a 4-20 mA current loop, and, via said connection, can both obtain the electrical power required for operating the measuring system from the aforementioned evaluation and supply unit of the data processing system and transmit measured values, optionally digitized measured values, to the data processing system—for example, by (load) modulation of a direct supply current fed by the evaluation and supply unit. Moreover, the measuring system electronics unit 20 may also be designed such that it can be operated nominally at a maximum power of 1 W or less and/or is intrinsically safe. Moreover, the measuring system electronics unit 20 may, for example, also be constructed in a modular manner in such a way that various electronic components of the measuring system electronics unit 20, such as a measurement and evaluation circuit DSV formed, for example, by means of one or more microprocessors and/or by means of one or more digital signal processors, for processing and evaluating the (vibration) measurement signals provided by the transducer 10, a driver circuit Exc for controlling the transducer or the exciter assembly thereof, an internal power supply circuit VS for providing one or more internal operating voltages, and/or the aforementioned transmitting and receiving circuit COM used to communicate with a superordinate measurement data processing system or an external fieldbus, are in each case arranged on one or more separate circuit boards and/or are in each case formed by means of one or more separate microprocessors. As can be seen from FIG. 1, the aforementioned transmitting and receiving circuit COM may, for example, also be provided for one of the outputs ($x_m$) of measured values ($X_M$) determined internally by the measuring system—for example, by the aforementioned measurement and control circuit DSV. Accordingly, the transmitting and receiving circuit COM may moreover be configured to convert received measured values $X_M$ into an output signal $x_m$ providing said measured value $X_M$, e.g., an output signal complying with an industry standard, i.e., for example, DIN IEC 60381-1:1985-11, IEC 61784-1 CPF1 (Foundation Fieldbus), IEC 61784-1 CPF3 (Profibus), IEC 61158, or IEC 61784-1 CPF9 (HART). In order to visualize measured values ($X_M$) generated internally by the measuring system and/or status messages generated internally by the measuring system, such as an error message or an alarm, on-site, the measuring system may furthermore have a display and operating element HMI, such as an LCD, OLED, or TFT display positioned in the aforementioned electronics housing 200 behind a window provided correspondingly therein, which HMI also communicates at least intermittently with the measuring system electronics unit 20, and a corresponding input keyboard and/or a touchscreen. In the case in which the measuring system has the aforementioned support frame 100, which is especially designed as a transducer protective housing, the electronics protective housing 200 may, for example, be fastened to said support frame, as also shown schematically in FIG. 1.

The measuring system electronics unit 20 is especially configured to energize the vibration exciter 31, namely to feed an electrical first drive signal e1 into the first vibration exciter 31, and to energize the second vibration exciter 32, namely to feed simultaneously to the first drive signal e1 an electrical second drive signal e2 into the second vibration exciter 32, by which the tube 111 or tubes 111, 113 perform forced mechanical vibrations, for example namely bending vibrations, with one or more vibration frequencies predefined by the drive signal e1 and the tube 112 or tubes 112, 114 perform forced mechanical vibrations, for example namely bending vibrations, with one or more vibration frequencies predefined by the drive signal e2. For generating the drive signals e1, e2, the measuring system electronics unit 20, as also shown schematically in FIG. 1 and as is quite common in such measuring systems, may, for example, have one or more separate driver circuits Exc, each formed, for example, by means of one or more phased lock loops (PLLs).

In addition, the measuring system electronics unit of the measuring system according to the invention is configured to generate, in a first operating mode, both the drive signal e1 with at least one first useful current component eN11, namely a sinusoidal current component dominating in terms of a current intensity or a single sinusoidal current component with an (alternating current) frequency and a phase angle, and to feed it into the vibration exciter 31, and to generate the drive signal e2 with at least one first useful current component eN21, namely a dominant or single sinusoidal current component with respect to a current intensity with an (alternating current) frequency corresponding to the (alternating current) frequency of the useful current components eN11 of the drive signal e1 and a phase angle deviating from the phase angle of the same useful current components eN11 of the drive signal Δe1, for example namely by 180°, and to feed it into the vibration exciter 32, in such a way that the drive signals e1, e2 have a first drive phase difference e1, namely a difference between the phase angles of their (first) useful current components eN11, eN21, especially amounting to 180°, and that the tube 111 performs at least proportionally, especially predominantly, first useful vibrations, namely mechanical vibrations forced by the (energized) vibration exciter 31, with at least a first useful frequency fN1, namely a vibration frequency corresponding to the (alternating current) frequency of the useful current component eN11 and with a first useful phase, namely a vibration phase corresponding, especially at least at the location of the vibration exciter 31, to the phase angle of the useful current component eN11, and the tube 12 performs at least proportionally, in particular predominantly, second useful vibrations, namely mechanical vibrations forced by the (energized) vibration exciter 32 with the first useful frequency fN1 and with a second useful phase, namely a vibration phase corresponding, especially at least at the location of the second vibration exciter, to the phase angle of the useful current components eN21 of the drive signal e2; this especially in such a way that the second useful vibrations (of the tube 112) are in out-of-phase or opposing to the first useful vibrations (of the tube 111) or that the first and second useful vibrations are suitable for causing Coriolis forces in the flowing measured substance that are dependent on the mass flow. As a result of the aforementioned first and second useful vibrations, each vibration signal s1, s2, s3, s4, as also indicated in FIG. 4, in each case also has a respective first (spectral) useful signal component sN11, sN21, sN31 and sN41, namely in each case a sinusoidal signal component with a frequency corresponding to the first useful frequency fN1. According to a further embodiment of the invention, the measuring system electronics unit is further configured, in the first operating mode, to generate the drive signals e1, e2 with a, in particular, predefinable and/or variable, first drive amplitude difference, namely a difference, for example also amounting to zero, between an amplitude of the useful current components eN11 of the drive signal e1 and an amplitude of the useful current components eN21 of the drive signal e2 and to feed it into the vibration exciter 31 or 32.

The program codes executed during operation of the measuring system in the measuring system electronics unit 20, i.e., for example, in one or more of the aforementioned microprocessors or digital signal processors of the measuring system electronics unit 20, can respectively be stored persistently, for example, in one or more non-volatile data memories (EEPROM) of the measuring system electronics unit 20, i.e., memories storing digital data even without an applied operating voltage, and, when said measuring system electronics unit is started up, can be loaded into a volatile data memory (RAM) provided, e.g., integrated into the microprocessor, in the measuring system electronics unit 20 or in the aforementioned measurement and evaluation circuit DSV. For processing in the microprocessor or in the digital signal processor, the vibration signals s1, s2, s3, s4 are of course first to be converted into corresponding digital signals by means of corresponding analog-to-digital converters (A/D), viz., for example, by, respectively, suitably digitizing the respective signal voltage of each of the vibration signals s1, s2, s3, s4, which are electrical here; cf. in this respect, for example, the aforementioned US-B 63 11 136. Accordingly, corresponding analog-to-digital converters for the vibration signals s1, s2, s3, s4 and/or at least one non-volatile electronic data memory EEPROM, which is configured to store digital data, viz., for example, even without an applied operating voltage, can be stored in the measuring system electronics unit 20, viz., for example, in the aforementioned measurement and evaluation circuit DSV.

The aforementioned (alternating current) frequency of the useful current components eN11 and eN21, i.e., the first or second useful frequency, may correspond, for example, to a resonance frequency of the tube assembly that is dependent on the density of the measured substance FL conducted in the tube assembly—for example, namely a lowest resonance frequency of the tube 111 and/or the tube 112. Accordingly, according to a further embodiment of the invention, a measuring system electronics unit 20 is further configured to provide the useful current component eN1 of the drive signal e1 and the useful current component eN2 of the drive signal e2, in each case with an (alternating current) frequency that deviates from a resonance frequency fr1 of the tube 111 by less than 1% of the same resonance frequency fr1 and/or by less than 1 Hz, or which deviates from a resonance frequency fr2 of the tube 112 by less than 1% of the same resonance frequency fr2 and/or by less than 1 Hz. In the typical case that the aforementioned resonance frequencies fr1, fr2 are of equal magnitude (fr1=fr2), i.e., that the tubes 111, 112 have at least one common resonance frequency fr12, the measuring system electronics unit may further be configured in particular to provide the useful current component eN1, eN2, in each case with an (alternating current) frequency that deviates from the aforementioned common resonance frequency fr12 by less than 1% of the same resonance frequency fr12 and/or by less than 1 Hz. The aforementioned common resonance frequency fr12 may, for example, be a resonance frequency fr12 of a (first) natural (bending) vibration mode inherent in the transducer, for example namely a fundamental bending vibration mode, in which the two tubes 111, 112 can or do perform opposing or out-of-phase mechanical (bending) vibrations, thus the measuring system electronics may also be configured to feed the same drive signals e1, e2 forcing out-of-phase mechanical vibrations into the vibration exciters 31, 32 in the first operating mode.

In addition to generating the two drive signals e1, e2, the measuring system electronics unit 20 is also configured to receive and evaluate the vibration signals s1, s2, s3, s4 in the first operating mode, namely to determine the aforementioned measured values for the at least one physical measured variable based on the vibration signals s1, s2, s3, s4, not least based on in each case at least one of the aforementioned useful signal components sN11, sN21, sN31, sN41, for example, based on the aforementioned first phase difference $\Delta\varphi12$ and/or based on the aforementioned second phase difference $\Delta\varphi34$, to generate mass flow measured values, namely measured values $X_M$ representing the mass flow of the measured substance FL and/or based on at least one signal frequency of at least one of the vibration signals s1, s2, s3, s4, for example namely based on the aforementioned useful frequency fN 1 of at least one of the vibration signals s1, s2, s3, s4, density measured values, namely measured values representing the density p of the measured substance FL; this, for example, also with a measuring system of the type in question, not least also in the case of the measuring systems mentioned at the beginning in US-A 2006/0266129, US-A 2007/0113678, US-A 2010/0011882, US-A 2012/0123705, US-A 2017/0356777, US-A 56 02 345, US-A 59 26 096, US-B 64 57 372, WO-A 2009/136943, WO-A 2019/017891, WO-A 2019/081169, WO-A 2019/

081170, WO-A 87/06691, WO-A 96/05484, WO-A 96/08697, WO-A 97/26508, WO-A 99/39164 or WO-A 2020/126285.

According to a further embodiment of the invention, the measuring system electronics unit 20 is accordingly further configured to generate mass flow measured values representing the mass flow in the first operating mode based on the aforementioned phase differences $\Delta\varphi12$, $\Delta\varphi34$, for example by means of a phase-difference-to-mass-flow-measured-value characteristic curve function programmed into the measuring system electronics, namely a characteristic curve function of the measuring system electronics, possibly also in the form of a (linear) parameter function, according to which a determined phase difference is thus converted into mass flow measured values $x_m$.

According to a further embodiment of the invention, the measuring system electronics unit 20 is also configured to determine the resonance frequency fR1 or the resonance frequency fr12, for example, namely to determine frequency values $X_f$ representing the resonance frequency fR1 or fR12 based on the useful current component eN1, eN2 of at least one of the drive signals e1, e2 and/or the useful signal component sN11, sN21, sN31 or sN41 of at least one of the vibration measurement signals s1, s2, s3, s4; this, for example, also in order to calculate density measured values $X_p$ representing the density based on such frequency values $X_f$, for example according to a corresponding resonance-frequency-to-density-measured-value characteristic curve function of the measuring system electronics unit. Alternatively or in addition, the measuring system electronics unit may also be provided or configured to generate, based on at least one of the vibration measurement signals s1, s2, s3, s4, and/or on at least one of the drive signals e1, e2, viscosity measured values, namely measured values representing the viscosity of the measured substance FL, in the first operating mode, for example, according to a damping-to-viscosity-measured-value characteristic curve function of the measuring system electronics unit. The processing of the vibration measurement signals s1, s2, s3, s4, and possibly also a control of the aforementioned driver circuit(s) Exc, which is quite customary in such measuring systems, may also take place, as is also shown schematically in FIG. 2 or 3—for example, also by means of the aforementioned measurement and evaluation circuit DSV.

The program codes executed during operation of the measuring system in the measuring system electronics unit 20, i.e., for example, in one or more of the aforementioned microprocessors or digital signal processors of the measuring system electronics unit 20, can respectively be stored persistently, for example, in one or more non-volatile data memories (EEPROM) of the measuring system electronics unit 20, i.e., memories storing digital data even without an applied operating voltage, and, when said measuring system electronics unit is started up, can be loaded into a volatile data memory (RAM) provided, e.g., integrated into the microprocessor, in the measuring system electronics unit 20 or in the aforementioned measurement and evaluation circuit DSV. For processing in the microprocessor or in the digital signal processor, the vibration measurement signals s1, s2, s3, s4 are of course first to be converted into corresponding digital signals by means of corresponding analog-to-digital converters (A/D), i.e., for example, by, respectively, suitably digitizing the respective signal voltage of each of the vibration measurement signals s1, s2, s3, s4, which are electrical here; cf. in this respect, for example, the above-mentioned US-B 63 11 136. Accordingly, corresponding analog-to-digital converters for the vibration measurement signals s1, s2, s3, s4 and/or at least one non-volatile electronic data memory EEPROM, which is configured to store digital data, i.e., for example, even without an applied operating voltage, can be provided in the measuring system electronics unit 20, viz., for example, in the aforementioned measurement and evaluation circuit DSV. In order to further improve the accuracy with which the measured values $X_M$ are ultimately determined, the transducer can, as also respectively shown schematically in FIGS. 2 and 3 and as quite customary in such measuring systems, furthermore also have temperature sensors 71 (71, 72) used to detect temperatures within the tube assembly and to provide one or more corresponding temperature measurement signals θ1 (θ1, θ2), and respectively attached, for example, directly to the at least one tube of the tube assembly, and/or strain sensors used to detect mechanical stresses within the tube assembly and to provide one or more corresponding strain measurement signals, and respectively attached, for example, directly to one of the tubes of the tube assembly, and the measuring system electronics unit can furthermore be configured to receive and process the temperature or strain measurement signals, i.e., especially to also use them in the determination of the measured values.

As already mentioned, vibration-type transducers, and therefore the vibronic measuring systems formed therewith, can be exposed during their service life to a plurality of loads, which cause significant deviations of the transducer or of the measuring system from a reference state determined in advance, e.g., a respective initial delivery state and/or a state during the start-up of the measuring system on-site; this especially also such that the tube assembly experiences such damage, e.g., due to overloads, that the vibration properties of the at least one tube change, or that the transducer is damaged overall because, inter alia, one or more system functions (transfer functions) that are inherent in the trans-ducer or measurement functions correspondingly formed in the measuring system have thereby also correspondingly changed in comparison to a respective (reference) system function of the original transducer or (reference) measure-ment function of the measuring system. Changes in the vibration characteristics of the at least one tube can be ascribed, for example, to changes in one or more modal flexural stiffness, mass and/or damping, viz., in each case determining one of the aforementioned vibration modes, and result in one or more (natural) vibration forms deviating from their respective equivalent when the transducer is in the reference state; this regularly also in such a way that an original, typically substantially homogeneous or even, dis-tribution of the aforementioned (system) parameters of (modal) flexural stiffness, (modal) mass and (modal) damp-ing is changed, viz., is increasingly unevenly distributed. In addition, during the service life of the measuring system, the at least one vibration exciter, as well as each of the vibration sensors, can also be subjected to changes relevant to the measurement accuracy, e.g., as a result of thermally-induced (over)load or aging—for example, in such a way that an electrical impedance of the transducer is also changed as a result. (Over)loads which can lead to damage to the tube assembly or the transducer as a whole, may, for example, be high (excess) temperatures or temperature shocks, exces-sively high pressures or pressure surges in the measured substance, excessively high clamping forces exerted on the transducer on the part of the process line and/or excessively strong vibration forces, harmful properties of the measured substance conducted in the transducer, or also material fatigue, and can, inter alia, result in a significant reduction in the wall thickness of the tube wall, e.g., due to corrosion and/or abrasion of the tube wall of the at least one tube caused by the measured substance, or in a significant reduc-tion in a flow cross-section of the tube assembly, e.g., as a result of an at least partial clogging of the tube assembly and/or as a result of a solid deposit on the inner side of the tube wall contacting the measured substance, in a plastic deformation of the at least one tube, or also in crack formation within the tube assembly, viz., for example, the tube wall, and therefore even lead to the transducer possibly no longer being safe.

The damage to the transducer or the tube assembly thereof can, especially, result in one or more (system) parameters characterizing system functions or a corresponding mea-surement function, e.g., a (scale) zero point and/or a (mea-surement) sensitivity (slope of the characteristic curve func-tion) of the aforementioned phase-difference-to-mass-flow-measured-value characteristic curve function corresponding to a change in the phase difference of the first useful signal components related to a change in the mass flow, are subject to corresponding changes over time, viz., especially have a drift. As a result of such (over)loads of the transducer occurring, and possibly also several times and/or recurrently for a longer period of time, the transducer can be damaged in the course of the operating time to such an extent that its functionality or a functionality of the measuring system as a whole is limited to a considerable extent or completely; this, for example, also in such a way that a fault or a malfunction of the measuring system, which possibly also leads to measurement errors in the determination of the measured values, is present as a result, e.g., because an integrity of at least one of the vibration measurement signals or measured values obtained therefrom is significantly reduced, and therefore a measurement accuracy of the measuring system, with which the measuring system ultimately represents the measured variable to be detected in the corresponding measured values, is significantly reduced compared to an initial or nominal measurement accuracy of the original or intact measuring system.

In order to check the measuring system, for example also in order to be able to recognize and, if necessary, report any changes in the transducer, for example in its mechanical properties and/or in its electrical properties, or a defect in the same transducer or in the measuring system formed there-with which is attributable thereto, as early as possible and as reliably as possible, the measuring system electronics unit 20 of the measuring system according to the invention is further configured, in a second operating mode activated, for example, chronologically preceding and/or chronologically following the first operating mode, in particular also in the course of a diagnosis of the measuring system (self-diagno-sis) carried out by the measuring system itself, to generate both the drive signal e1 with a second useful current component eN12, namely a sinusoidal current component that is dominant with respect to a current intensity or the only sinusoidal current component with an (alternating current) frequency and a phase angle, and to feed it into the vibration exciter 31, and to generate the drive signal e2 with at least one second useful current component eN22, namely a sinusoidal current component that is dominant with respect to a current intensity or is the only sinusoidal current component with an (alternating current) frequency corre-sponding to the (alternating current) frequency of the useful current components eN12 of the drive signal e1 and a phase angle that deviates from the phase angle of the useful current components eN12 of the drive signal e1 by less than 180°, for example corresponding to the phase angle of the useful current components eN12 of the drive signal e1, and to feed it into the vibration exciter 32, in such a way that the drive signals e1, e2 have a second drive phase difference deviating from the aforementioned drive phase difference Δe1, for example by 180°, namely a difference, for example amounting to 0°, between the phase angles of their (second) useful current components eN12, eN22, and that the tube 111 at least proportionally, in particular predominantly, has third useful vibrations, namely mechanical vibrations forced by the (energized) vibration exciter 31 with at least a second useful frequency fN2, namely a vibration frequency corresponding to the (alternating current) frequency of the (second) useful current component eN12 of the drive signal e1 and with a third useful phase, namely a vibration phase corresponding, in particular at least at the location of the vibration exciter 31, corresponding to the phase angle of the useful current component eN12 of the drive signal e1, and the tube 112 at least proportionally, especially predominantly, has fourth useful vibrations, namely mechanical vibrations forced by the (energized) vibration exciter 32 with the aforementioned useful frequency fN2 and with a fourth useful phase, namely a vibration phase corresponding, in particular at least at the location of the vibration exciter 32, to the phase angle of the useful current components eN22 of the drive signal e2; this especially in the way that the fourth useful vibrations (of the tube 12) are in phase with the third useful vibrations (of the tube 11). According to a further embodiment of the invention, the measuring system electronics unit is further configured in the second operating mode to generate the drive signals e1, e2 with a second drive amplitude difference, for example corresponding to the aforementioned first drive amplitude difference and/or predefinable and/or variable, namely a difference, for example also amounting to zero, between an amplitude of the useful current components eN12 of the drive signal e1 and an amplitude of the useful current components eN22 of the drive signal e2 and to feed it into the first or second vibration exciter. The measuring system electronics unit 20 can, for example, be configured to start the second operating mode recurrently for a limited time of more than 10 ms each time, in particular also more than 100 ms.

The aforementioned (alternating current) frequency of the useful current components eN12 and eN22, i.e., the third and fourth useful frequency, may for example be a resonance frequency of at least one of the tubes 111, 112, for example also a resonance frequency fr34 of a natural (parallel) vibration mode inherent in the transducer, in which the two tubes 111, 112 can or do perform in-phase mechanical (resonance) vibrations, for example namely in-phase bending vibrations. Accordingly, according to a further embodiment of the invention, a measuring system electronics unit is further configured to provide the useful current component eN12 of the drive signal e1 and the useful current component eN22 of the drive signal e2 in each case with an (alternating current) frequency that deviates from a resonance frequency of at least one of the tubes 111, 112, for example namely the aforementioned resonance frequency fr34, by less than 1% of the same resonance frequency and/or by less than 1 Hz; this for example also with a second drive phase difference amounting to 0° or in such a way that the third and fourth useful vibrations of the aforementioned natural parallel vibration mode are corresponding (resonance) vibrations of the tubes 111, 112. In addition, the exciter assembly (31, 32) or the first and second vibration exciters are accordingly also configured to excite mechanical (resonance) vibrations of the tubes 111, 112 corresponding to the aforementioned natural parallel vibration mode, under the control of the drive signals (e1, e2).

Figure 5:
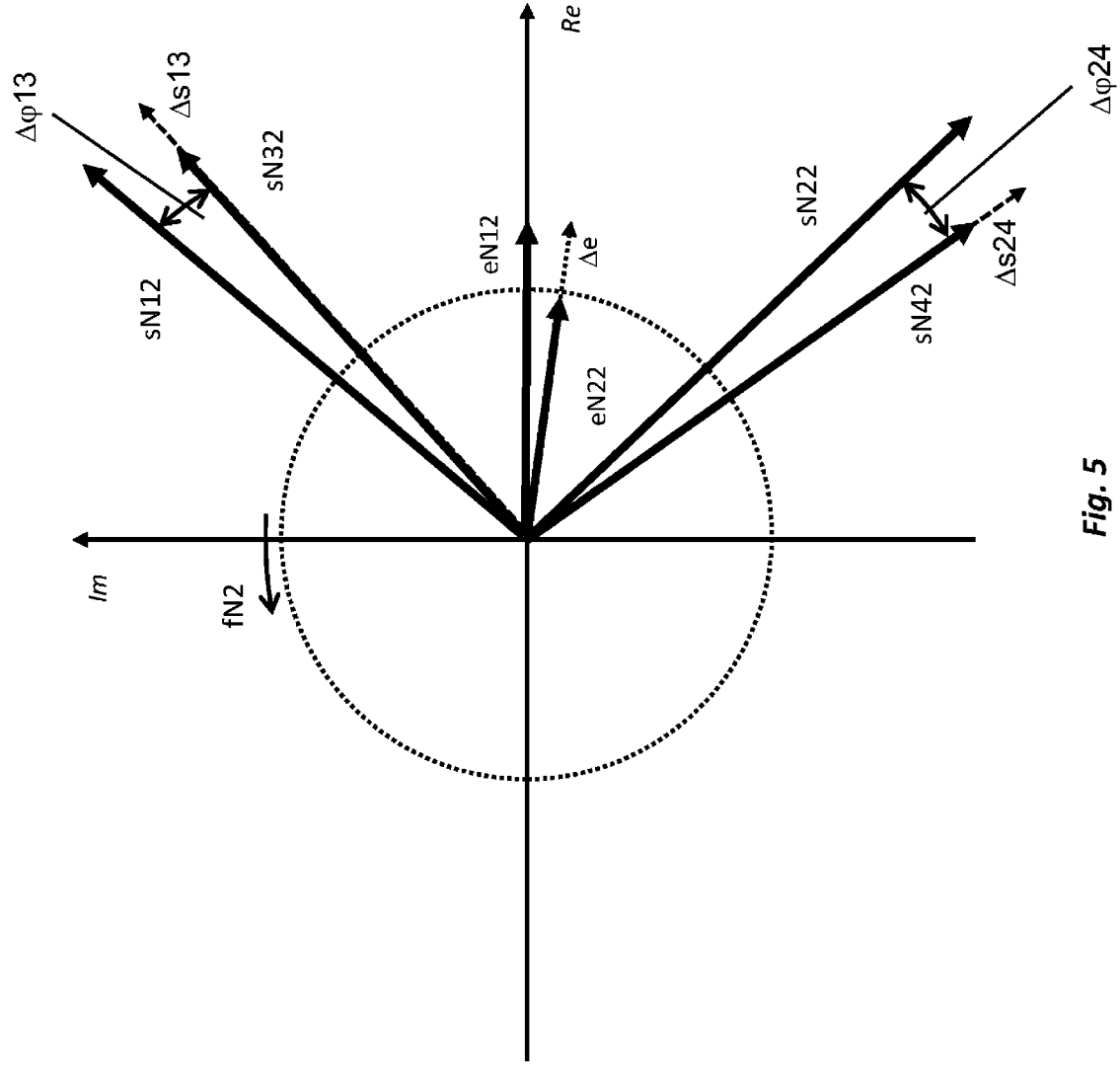

As a result of the third and fourth useful vibrations, each vibration signal s1, s2, s3, s4, as also indicated in FIG. 5, has a second (spectral) useful signal component sN12, sN22, sN32 or sN42, namely a respective sinusoidal signal component with a frequency corresponding to the second useful frequency fN2. The measuring system electronics unit 20 according to the invention is also configured to receive and evaluate the vibration signals s1, s2, s3, s4 in the second operating mode, namely based on the first and third vibration signals s1, s3 and/or second and fourth vibration signals s2, s4 received in the second operating mode, for example namely based on a respective amplitude of the useful signal component sN12, sN32 of the vibration signals s1, s3 and/or a respective amplitude of the useful signal component sN22, sN42 of the vibration signals s2, s4 and/or by means of a respective phase angle of the useful signal components sN12, sN32 of the vibration signals s1, s3 and/or a respective phase angle of the useful signal components sN22, sN42 of the vibration signals s2, s4, to calibrate the measuring system and/or to check the measuring system or to detect whether a fault of the measuring system has occurred. Such a fault of the measuring system may be present, as already mentioned, for example due to deposits on an inner side of the tube wall of one or more of the tubes and/or due to a reduction of a wall thickness of the tube wall of one or more of the tubes and/or due to aging of one or more of the vibration sensors and/or vibration exciters and/or due to a faulty assembly and/or installation of the transducer. In addition, such a fault of the measuring system may, among other things, also lead to a reduction in the overall functionality of the measuring system or to a malfunction of the measuring system, for example also in such a way that the integrity of at least one of the vibration signals s1, s2, s3, s4 or measured values obtained therefrom in the first operating mode is reduced, possibly to such an extent that measured values obtained from at least one of the vibration signals s1, s2, s3, s4 in the first operating mode have an impermissible measurement error.

According to a further embodiment of the invention, the measuring system electronics unit 20 is in particular also configured to detect, based on at least one of the vibration signals s2, s1, s3, s4 received in the second operating mode, in particular their respective useful signal component sN11, sN21, sN31, sN41, whether a fault of the measuring system is present, for example namely a fault ¿ that reduces a functionality of the measuring system or causes a malfunction of the measuring system and/or that can reduce an integrity of at least one of the vibration signals s1, s2, s3, s4, thus also reducing an integrity of measured values obtained from the vibration signals s1, s2, s3, s4 and/or provoking a measurement error of the same measured values. The same fault & may, for example, also significantly influence a phase angle and/or an amplitude of one or more of the useful signal components sN11, sN21, sN31, sN41, for example in such a way that the aforementioned phase difference Δφ12 deviates from the phase difference Δφ34 and/or a corresponding reference value by more than a tolerance dimension previously determined for this purpose. In addition, the measuring system electronics unit 20 can furthermore be configured to output a (fault) message, for example also declared as a (fault) alarm, if a fault & of the measuring system is determined accordingly. The same fault & of the measuring system may occur, as previously mentioned, due to, for example, deposits on an inner side of the tube wall of one or more of the tubes, a reduction in a wall thickness of the tube wall of one or more of the tubes, aging of one or more of the vibration sensors and/or aging of one or more of the vibration exciters. The aforementioned fault & of the measuring system may in particular also comprise a change, possibly also irreversible, of one or more vibration characteristics of the tube assembly, for example due to a reduction of a wall thickness of the tube wall of one or more of the tubes and/or due to a plastic deformation of one or more of the tubes and/or due to deposits on an inner side of the tube wall of one or more of the tubes and/or due to a crack in the tube wall of one or more of the tubes. Last but not least, in the event that the aforementioned support frame and the tube assembly are detachably fastened to one another again, as also proposed in WO-A 96/08697 or WO-A 2019/017891 mentioned at the beginning, for example in order to enable the support frame and tube assembly to be brought together or mounted on-site at the respective measuring point or in the vicinity thereof, the fault & of the measuring system may also include, for example, incorrect mounting of the support frame and tube assembly. In addition, the fault of the measuring system can also be a, possibly irreversible, change of one or more flow characteristics of the tube assembly, for example due to a reduction of a flow cross-section of the tube assembly, for example namely due to a blockage of one or more of the tubes and/or due to deposits on an inner side of the tube wall of one or more of the tubes and/or a, possibly also irreversible, change in one or more electro-mechanical transducer properties, for example due to aging of one or more of the vibration sensors and/or vibration exciters and/or due to a change in a respective mechanical connection between one or more vibration sensors or one or more vibration exciters and the respective tube. However, a fault of the measuring system may also be a, possibly also irreversible, change of a (scale) zero point of the measuring system, which can correspond, for example, to a phase difference $\Delta\varphi12$, $\Delta\varphi34$ that is nevertheless measured when the measured substance is at rest, and/or a, possibly also irreversible, change of a (measuring) sensitivity of the measuring system, which can correspond to a change of the phase difference $\Delta\varphi12$, $\Delta\varphi34$ related to a change in the mass flow.

For checking the measuring system, according to a further embodiment of the invention, the measuring system electronics unit is further configured to determine, based on the vibration signals s1, s3 received in the second operating mode, a first (test) amplitude difference, namely a difference between an amplitude of the useful signal component sN12 of the vibration signal s1 and an amplitude of the useful signal component sN32 of the vibration signal s3 and/or a first (test) phase difference, namely a difference between a phase angle of the useful signal components sN12 of the vibration signal s1 and the useful signal components sN32 of the vibration signal s3. Alternatively or in addition, the measuring system electronics unit is further configured to determine, based on the vibration signals s2, s4 received in the second operating mode, a second (test) amplitude difference, namely a difference between an amplitude of the useful signal component sN22 of the vibration signal s2 and an amplitude of the useful signal component sN42 of the vibration signal s4 and/or a second (test) phase difference, namely a difference between a phase angle of the useful signal components sN22 of the vibration signal s2 and the useful signal components sN42 of the vibration signal s4. According to a further embodiment of the invention, the measuring system electronics unit is further configured to determine at least one (modal) damping of the tubes 11, 12 for the third or fourth useful vibrations, based on at least one of the drive signals e1, e2 fed in in the second operating mode and based on at least one of the vibration signals s1, s2, s3, s4 received in the second operating mode, for example namely based on the second useful current components eN12, eN2 of at least one of the drive signals e1, e2, and based on the useful signal components sN12, sN32 of the vibration signals s1, s3 and/or the useful signal components sN22, sN42 of the vibration signals s2, s4. In addition, the measuring system electronics unit can furthermore be configured to compare one or more of the aforementioned measured parameters, namely at least one of the first or second (test) amplitude differences, at least one of the first or second (test) phase differences and/or at least one of the modal dampings, in each case with at least one associated reference value representing a reduced functionality or a defect of the transducer, for example in order to output a message, possibly also declared as a (fault) alarm, in the case of a deviation of the respective parameter that is too large, i.e., exceeds a measure predefined for this purpose. According to a further embodiment of the invention, it is further provided to start the second operating mode or carry out a check of the measuring system if the transducer does not have fluid flowing through it or if the measured substance is at rest in it, i.e., if the mass flow is zero. Alternatively or in addition, the measuring system can be checked, as also indicated in FIG. 5, also with a transducer through which a fluid or the measured substance to be measured flows, i.e., with a mass flow other than zero, for example namely also with a predefined (known) and/or constant reference mass flow.

In order to detect the presence of a fault that impairs the functionality of the measuring sensor and therefore the measurement accuracy of the measuring system, the measuring system electronics unit 20 according to a further embodiment of the invention is furthermore configured to evaluate one or more characteristic number values for the at least one measuring system characteristic number MK1, namely, for example, to compare them in each case to one or more reference values $BK1_1$ ($BK1_1$, $BK1_2$, . . . $BK1_i$ . . . ) determined in advance for said measuring system characteristic number MK1, namely, for example, stored in the aforementioned non-volatile electronic data memory EEPROM. The measuring system characteristic number MK1 or a respective characteristic number value may, for example, characterize, for example quantify, an operating state of the measuring system that determines a system function (transfer function) inherent in the measuring system, one or more functional dependencies of one or more of the vibration signals s1, s2, s3, s4 on one or more of the drive signals e1, e2 or a functionality of the measuring system. In addition, the measuring system electronics unit 20 may furthermore also be configured to determine whether one or more characteristic number values for the measuring system characteristic number MK1 are greater than one or more such reference values for the measuring system characteristic number MK1, namely, for example, reference values representing a measuring system that is no longer intact, and possibly, for example, also to output the (fault) message signaling this, namely, for example, to display it on-site and/or to transmit it as a status message to the aforementioned electronic data processing system. Accordingly, according to a further embodiment of the invention, the measuring system electronics unit is configured to calculate one or more characteristic number values for the at least one measuring system characteristic number MK1 based on one or more of the vibration signals s1, s2, s3, s4 received in the second operating mode, in such a way that said measuring system characteristic number MK1 is dependent on one or more of the (system) parameters of one of the aforementioned system functions of the measuring system mediating between at least one of the second useful current components eN12, eN22 of the drive signals e1, e2 and at least one of the second useful signal components sN12, sN22, sN32, sN42 of the vibration signals s1, s2, s3, s4, for example also correspond to one of the aforementioned (modal) dampings of the tubes 111, 112 for the respective third or fourth useful vibrations, and/or to a ratio of one of the (modal) dampings of the tubes 111, 112 for the respective third or fourth useful vibrations, and a (modal) damping of the tubes 11, 12 for the respective first and/or second useful vibrations of the tubes 111, 112. The measuring system characteristic number MK1 may, for example, depend on a (system) amplitude ratio between a deviation $\Delta e$ of an amplitude of the useful current component eN22 of the drive signal e2 from an amplitude of the useful current components eN12 of the drive signal e1 and a deviation $\Delta s13$ of an amplitude of the useful signal component sN13 of the vibration signal s3 from an amplitude of the useful signal component s12 of the vibration signal s1 and/or a deviation $\Delta s24$ of an amplitude of the useful signal component sN42 of the vibration signal s4 from an amplitude of the useful signal component sN22 of the vibration signal s2, for example also a sum $\Delta s13+\Delta s24$ of the same deviations, or quantify one of the aforementioned (system) amplitude ratios $\Delta s13/\Delta e$, $\Delta s24/\Delta e$, $\Delta s13/\Delta e+\Delta s24/\Delta e$. The aforementioned deviations may be absolute deviations or relative deviations. Alternatively or in addition, the measuring system characteristic number K1 may also be formed from a (system) phase difference between the second useful signal component sN12, sN22 of at least one of the vibration measurement signals s1, s2, for example also a sum sN12+sN22 of the useful signal component sN12, sN22 of the vibration signals s1, s2, and the second useful signal component sN32, sN42 of at least one of the vibration measurement signals s3, s4, for example a sum sN32+sN42 of the second useful signal component sN32, sN42 of the vibration signals s3, s4, for example namely may quantify one of the aforementioned (system) phase differences. The aforementioned reference values for the measuring system characteristic number MK1 may, for example, be reference values representing a reduced functionality of the transducer (attributable to one of the aforementioned faults) or a malfunction (attributable to one of the aforementioned faults) of the transducer. The same reference values may, for example, be determined, for example, in advance, namely, by the manufacturer of the measuring system or during a (factory) calibration carried out during the production of the measuring system and/or during commissioning on-site, and/or during operation of the measuring system; this, for example, in such a way that first the respective measuring system characteristic number MK1 is determined for the finished and therefore intact measuring system and is converted into the reference value $BK1_1$ with a tolerance value corresponding to a still tolerable influence and stored in the data memory EEPROM. The determination of the characteristic number values MK1 or the determination of the presence of a fault of the measuring system may, as already indicated, also be initiated or suspended again in an automated manner, for example namely in a time-controlled manner and/or also as a function of changes in other diagnostic values. Alternatively or in addition, however, the determination of the characteristic number values can also be initiated and/or suspended from outside the measuring system, namely, for example, starting from the aforementioned electronic data processing system via the aforementioned transmitting and receiving circuit COM and/or starting from operating personnel on-site via the aforementioned display and operating element HMI. Accordingly, the measuring system electronics unit 20 according to a further is configured to receive and evaluate a start command that initiates at least the determination of the characteristic number values for at least the characteristic number K1, namely, possibly, also the aforementioned evaluation thereof, namely to detect an input of the start command and then to start a determination of the characteristic number values for the first measuring system characteristic number MK1, and/or the measuring system electronics unit is configured to receive and evaluate a stop command that at least temporarily suspends the determination of the characteristic number values for the measuring system characteristic number MK1, namely to detect an input of the stop command and then at least temporarily stop a determination of the characteristic number values for the first measuring system characteristic number MK1.

The invention claimed is:

1. A vibronic measuring system for measuring and/or monitoring at least one flow parameter and/or for measuring and/or monitoring at least one substance parameter of a flowing measured substance, the vibronic measuring system comprising:

a transducer including a tube assembly for conducting the flowing measured substance, an exciter assembly for converting electrical power into mechanical power used to excite and maintain forced mechanical vibrations of the tube assembly, and a sensor assembly for detecting mechanical vibrations of the tube assembly and for providing vibration signals respectively representing vibration movements of the tube assembly; and a measuring system electronics unit that is electrically coupled to the transducer, including both to the exciter assembly and to the sensor assembly, that is formed by at least one microprocessor, that is arranged in an electronics protective housing, and that is embodied for controlling the transducer and for evaluating vibration signals provided by the transducer, wherein the tube assembly includes a first tube, and at least a second tube, wherein each of the first and second tubes of the tube assembly extends in each case from a respective first end of the respective tube to a respective second end of the same tube with a respective tube length and has in each case a lumen enclosed by a tube wall extending from the respective first end of the respective tube to the respective second end of the same tube, wherein each of the first and second tubes of the tube assembly is configured to be traversed by the flowing measured substance and to be vibrated, wherein the exciter assembly includes two vibration exciters of which a first vibration exciter is mechanically connected to the first tube and positioned centrally on the first tube, and a second vibration exciter is mechanically connected to the second tube and positioned centrally on the second tube, wherein each of the first and second vibration exciters is configured in each case to convert electrical power with a time-varying electrical current into mechanical power in such a way that a time-varying driving force acts on the first or second tube at a respective point of application formed by the respective vibration exciter on the tube mechanically connected thereto in each case, wherein the sensor assembly includes at least four vibration sensors of which a first vibration sensor and a second vibration sensor are positioned on the first tube spaced apart from one another and a third vibration sensor and a fourth vibration sensor are positioned on the second tube spaced apart from one another, wherein each of the first and second vibration sensors is in each case configured to detect vibration movements of the first tube and to convert the vibration movements of the first tube into a first or second vibration signal representing the vibration movements of the first tube such that each of the first and second vibration signals in each case contains one or more sinusoidal signal components having a frequency corresponding to a vibration frequency of vibration movements of the first tube, wherein each of the third and fourth vibration sensors is in each case configured to detect vibration movements of the second tube and to convert the vibration movements of the second tube into a respective third or fourth vibration signal representing the vibration movements of the second tube such that each of the third and fourth vibration signals in each case contains one or more sinusoidal signal components having a frequency corresponding to a vibration frequency of vibration movements of the second tube, wherein the measuring system electronics unit is configured to feed an electrical first drive signal into the first vibration exciter by which the first tube performs forced mechanical bending vibrations at one or more vibration frequencies predefined by the first drive signal and simultaneously to feed an electrical second drive signal into the second vibration exciter by which the second tube performs forced mechanical bending vibrations at one or more vibration frequencies predefined by the second drive signal, wherein the measuring system electronics unit is further configured, in a first operating mode, to generate the first drive signal with a first useful current component having a sinusoidal current component that is dominant with respect to a current intensity or the only sinusoidal current component, with an alternating frequency and a phase angle, and feed the first drive signal into the first vibration exciter, and to generate the second drive signal with a first useful current component having a sinusoidal current component that is dominant with respect to a current intensity or the only sinusoidal current component, with an alternating frequency corresponding to the alternating frequency of the first useful current component of the first drive signal and a phase angle deviating from the phase angle of the first useful current component of the first drive signal and to feed the second drive signal into the second vibration exciter, in such a way:

that the first and second drive signals have a first drive phase difference between the phase angles of their respective first useful current components, that the first tube at least partially performs first useful mechanical vibrations forced by the first vibration exciter having a first useful vibration frequency corresponding to the alternating frequency of the first useful current component of the first drive signal and with a first useful vibration phase corresponding to the phase angle of the first useful current component of the first drive signal, and the second tube performs at least partially second useful mechanical vibrations forced by the second vibration exciter having the first useful frequency and with a second useful vibration phase corresponding, at least at the location of the second vibration exciter, to the phase angle of the first useful current components of the second drive signal, and that each of the first, second, third and fourth vibration signals in each case has a respective first useful signal component that is a respective sinusoidal signal component having a frequency corresponding to the first useful frequency, wherein the measuring system electronics unit is further configured, in a second operating mode, to generate the first drive signal with a second useful current component having a dominant or single sinusoidal current component with respect to a current intensity or the only sinusoidal current component with an alternating frequency and a phase angle and to feed the first drive signal into the first vibration exciter, and to generate the second drive signal with a second useful current component that is a sinusoidal current component that is dominant with respect to a current intensity or the only sinusoidal current component with an alternating frequency corresponding to the alternating frequency of the second useful current component of the first drive signal and a phase angle that deviates from the phase angle of the second useful current component of the first drive signal by less than 180°, and corresponding to the phase angle of the second useful current component of the first drive signal and to feed the second drive signal into the second vibration exciter in such a way:

that the first and second drive signals have a second drive phase difference, namely a difference between the phase angles of their second useful current components, that deviates from the first drive phase difference, that the first tube performs third useful mechanical vibrations forced by the first vibration exciter with at least a second useful vibration frequency corresponding to the alternating frequency of the second useful current component of the first drive signal, and with a third useful vibration phase corresponding, at least at the location of the first vibration exciter, to the phase angle of the second useful current component of the first drive signal, and the second tube performs at least partially fourth useful mechanical vibrations forced by the second vibration exciter with the second useful frequency and with a fourth useful vibration phase correspondingly, at least at the location of the second vibration exciter, to the phase angle of the second useful current components of the second drive signal such that the fourth useful vibrations are in phase with the third useful vibrations, and that each of the first, second, third and fourth vibration signals in each case has a second useful sinusoidal signal component having a frequency corresponding to the second useful frequency, and wherein the measuring system electronics unit is further configured:

in the first operating mode, to receive and evaluate the first, second, third, and fourth vibration signals, including to determine measured values quantifying the at least one physical measured variable based on the vibration signals, and and, in the second operating mode, to receive and evaluate the first, second, third, and fourth vibration signals, and, based on the first and third and/or second and fourth vibration signals received in the second operating mode, to calibrate the measuring system and/or to check the measuring system or to detect whether a fault of the measuring system is present.

2. The measuring system according to claim 1, wherein the measuring system electronics unit is configured to provide the first and/or second useful current components of the first and second drive signals with an alternating frequency that deviates from a resonance frequency of the first tube and/or a resonance frequency of the second tube by less than 1% of said resonance frequency and/or by less than 1 Hz.

3. The measuring system according to claim 1, wherein the first and second tubes have at least one common resonance frequency, and wherein the measuring system electronics unit is further configured to provide, in the first operating mode, the first useful current component of the first and second drive signals, in each case at an alternating frequency that deviates from the same common resonance frequency of the first and second tubes by less than 1% of the same resonance frequency and/or by less than 1 Hz.

4. The measuring system according to claim 1, wherein the transducer has a first natural bending vibration mode in which the first and second tubes can and do perform out-of-phase or opposing mechanical vibrations, and wherein the measuring system electronics unit is configured to feed in the first mode of operation first and second drive signals forcing out-of-phase mechanical vibrations into the first or second vibration exciters, to provide the first useful current components of the first and second drive signals with an alternating frequency deviating from a resonance frequency of the first natural bending vibration mode by less than 1% of the same resonance frequency and/or by less than 1 Hz, and/or with phase angles causing a first drive phase difference of 180°, and wherein the transducer has a second natural bending vibration mode in which the first and second tubes can or do perform in-phase mechanical vibrations, and wherein the measuring system electronics unit is configured to feed, in the second mode of operation, first and second drive signals forcing out-of-phase mechanical vibrations into the first or second vibration exciters, to provide the first useful current components of the first and second drive signals with an alternating frequency deviating from a resonance frequency of the second natural bending vibration mode by less than 1% of the same resonance frequency and/or by less than 1 Hz, and/or with phase angles causing a second drive phase difference of 0°.

5. The measuring system according to claim 1, wherein the measuring system electronics unit is configured to detect, based on at least one of the first, second, third, and fourth vibration signals received in the second operating mode whether a fault of the measuring system reducing a functionality of the measuring system and/or causing a malfunction of the measuring system and/or reducing an integrity of at least one of the first, second, third, and fourth vibration signals or measured values obtained therefrom and/or provoking a measuring error of measured values obtained therefrom, due to deposits on an inner side of the tube wall of one or more of the tubes and/or due to a reduction of a wall thickness of the tube wall of one or more of the tubes and/or due to aging of one or more of the vibration sensors and/or vibration exciters, is present.

6. The measuring system according to claim 1, wherein each of the first useful signal components of the first, second, third, and fourth vibration signals has a phase angle dependent on a mass flow of a measured substance flowing through the tube assembly or the transducer formed therewith.

7. The measuring system according to claim 6, wherein the measuring system electronics unit is configured, at least in the first operating mode, to determine mass flow values, the mass flow of the flowing measured substance, based on a first phase difference between the phase angle of the first useful signal component of the first vibration signal and the phase angle of the first useful component of the second vibration signal, and based on a second phase difference between the phase angle of the first useful signal component of the third vibration signal and the phase angle of the first useful signal component of the fourth vibration signal.

8. The measuring system according to claim 7, wherein the fault of the measuring system comprises a change of a zero point of the measuring system that corresponds to a first and/or second phase difference measured if the mass flow is zero, and/or a measuring sensitivity of the measuring system that corresponds to a change of the first and/or second phase difference related to a change in the mass flow.

9. The measuring system according to claim 8, wherein the fault of the measuring system comprises a change of one or more vibration characteristics of the tube assembly due to a reduction of a wall thickness of the tube wall of one or more of the tubes and/or due to a plastic deformation of one or more of the tubes and/or due to deposits on an inner side of the tube wall of one or more of the tubes and/or due to a crack in the tube wall of one or more of the tubes, and/or wherein the fault of the measuring system comprises a change of one or more flow characteristics of the tube assembly due to a reduction in a flow cross-section of the tube assembly as a result of a blockage of one or more of the tubes and/or as a result of deposits on an inner side of the tube wall of one or more of the tubes, and/or wherein the fault of the measuring system comprises a change of one or more electro-mechanical transducer properties due to aging of one or more of the vibration sensors and/or vibration exciters and/or due to a change of a respective mechanical connection between one or more vibration sensors or one or more vibration exciters and the respective tube, and/or wherein the fault of the measuring system comprises a faulty installation and/or assembly of the transducer or the measuring system formed therewith.

10. The measuring system according to claim 1, wherein the measuring system electronics unit is configured to obtain or determine the respective first useful signal component including a respective amplitude and/or a respective phase angle, from each of the first, second, third, and fourth vibration signals received in the first operating mode; and/or wherein the measuring system electronics unit is configured to obtain or determine the respective second useful signal component, including a respective amplitude and/or a respective phase angle, from each of the first, second, third, and fourth vibration signals received in the second operating mode.

11. The measuring system according to claim 1, wherein the measuring system electronics unit is configured to determine a first amplitude difference, including a difference between an amplitude of the second useful signal components of the first and third vibration signals, based on the first and third vibration signals received in the second operating mode, and to compare the first amplitude difference with at least one reference value representing a reduced functionality or a defect of the transducer or, in the case of a deviation that is too large or that exceeds a reference value predefined for this purpose, to output a message declared as an alarm; and/or wherein the measuring system electronics unit is configured to determine a first phase difference, including a difference between a phase angle of the second useful signal components of the first and third vibration signals, based on the first and third vibration signals received in the second operating mode, and to compare the first phase difference with at least one reference value representing a reduced functionality or a defect of the transducer or, in the case of a deviation that is too large or that exceeds a reference value predefined for this purpose, to output a message declared as an alarm; and/or wherein the measuring system electronics unit is configured to determine a second amplitude difference, including a difference between an amplitude of the second useful signal components of the second and fourth vibration signals, based on the second and fourth vibration signals received in the second operating mode, and to compare the second amplitude difference with at least one reference value representing a reduced functionality or a defect of the transducer or, in the case of a deviation that is too large or that exceeds a reference value predefined for this purpose, to output a message declared as an alarm; and/or wherein the measuring system electronics unit is configured to determine a second (test) phase difference, including a difference between a phase angle of the second useful signal components of the second and fourth vibration signals, based on the second and fourth vibration signals received in the second operating mode, and to compare the second phase difference with at least one reference value representing a reduced functionality or a defect of the transducer or, in the case of a deviation that is too large or that exceeds a reference value predefined for this purpose, to output a message declared as an alarm.

12. The measuring system according to claim 1, wherein the measuring system electronics unit is configured to generate the first and second drive signals in the first operating mode with a predefinable and/or variable first drive amplitude difference amounting to zero between an amplitude of the first useful current component of the first drive signal and an amplitude of the first useful current component of the second drive signal, and to feed them into the first or second vibration exciters; and/or wherein the measuring system electronics unit is configured to generate the first and second drive signals in the second operating mode with a second drive amplitude difference corresponding to the first drive amplitude difference and/or predefinable and/or variable amounting to zero between an amplitude of the second useful current component of the first drive signal and an amplitude of the second useful current component of the second drive signal and to feed them into the first or second vibration exciter.

13. The measuring system according to claim 1, wherein the measuring system electronics unit is configured, based on the first and second drive signals fed in in the second operating mode and based on the first and third vibration signals and/or the second and fourth vibration signals to determine a damping of the first and second tubes for second useful vibrations and to compare the damping with at least one reference value representing a reduced functionality or a defect of the transducer or, in the case of a deviation that is too large or that exceeds a reference value predefined for this purpose, to output a message declared, especially, as an alarm.

14. The measuring system according to claim 1, wherein the measuring system electronics unit is configured to calculate, based on one or more of the first, second, third, and fourth vibration signals received in the second operating mode, one or more characteristic number values for a measuring system characteristic number that characterizes an operating state or a system function inherent in the measuring system that determines one or more functional dependencies of one or more of the vibration signals on one or more of the drive signals or that determines a functionality of the measuring system in such a way that the measuring system characteristic number is dependent on one or more parameters of the system function of the measuring system mediating between at least the second useful current components of the first and second drive signals and at least one of the second useful signal components of the first, second, third, and fourth vibration signals.

15. The measuring system according to claim 14, wherein the measuring system characteristic number depends on an amplitude ratio between an absolute or relative deviation of an amplitude of the second useful current component of the second drive signal from an amplitude of the second useful current component of the first drive signal and an absolute or relative deviation of an amplitude of the second useful signal component of the third vibration signal from an amplitude of the second useful signal component of the first vibration signal and/or an absolute or relative deviation of an amplitude of the second useful signal component of the fourth vibration signal depends on an amplitude of the second useful signal component of the second vibration signal, including a sum of the deviations of the second useful signal components.

16. The measuring system according to claim 14, wherein the measuring system characteristic number is dependent on a phase difference between the second useful signal component of at least one of the first and second vibration measuring signals, and the second useful signal component of at least one of the third and fourth vibration measurement signals, the measuring system characteristic number quantifies the phase difference.

17. The measuring system according to claim 16, wherein the measuring system electronics unit is configured to compare one or more characteristic number values for the measuring system characteristic number in each case to one or more reference values determined for the measuring system characteristic number by the manufacturer of the measuring system and/or during production and/or commissioning of the measuring system, including one or more reference values representing a reduced functionality of the transducer and/or one or more reference values representing a malfunction of the transducer and/or one or more reference values representing a defective transducer, and to evaluate and/or quantify a deviation of one or more of the characteristic number values from one or more of the reference values.

18. The measuring system according to claim 17, wherein the measuring system electronics unit is configured to determine whether one or more characteristic number values for the measuring system characteristic number are greater than the at least one reference value for the measuring system characteristic number representing a reduced functionality of the transducer and/or greater than one or more reference values representing a malfunction of the transducer and/or greater than one or more reference values representing a no longer intact transducer, to output a message declared as an alarm.

19. The measuring system according to claim 1, wherein the measuring system electronics unit has a non-volatile electronic data memory that is configured to store digital data even without an applied operating voltage and to store one or more reference values determined in advance for a measuring system characteristic number.

20. The measuring system according to claim 19, wherein one or more reference values determined in advance by the manufacturer of the measuring system and/or during production of the measuring system and/or during operation of the measuring system for the measuring system characteristic number are stored in the electronic data memory.

21. The measuring system according to claim 20, wherein the measuring system electronics unit is configured to respectively compare one or more characteristic number values for the measuring system characteristic number to one or more reference values, stored in the data memory, for the measuring system characteristic number.

22. The measuring system according to claim 1, wherein the tube assembly has a first, and/or inlet-side, flow divider that is used as a line-branching unit and has at least two flow openings and a second, and/or outlet-side, flow divider that is structurally identical to the first flow divider and/or used as a line-merging unit and has at least two flow openings, and wherein each of the first and second tubes of the tube assembly is connected to each of the first and second flow dividers in such a way that the first tube opens with its first end into a first flow opening of the first flow divider and with its second end into a first flow opening of the second flow divider and the second tube opens with its first end into a second flow opening of the first flow divider and with its second end into a second flow opening of the second flow divider.

23. The measuring system according to claim 22, wherein the tube assembly has a first coupler element that is plate-shaped and that is positioned further away from the second flow divider than from the first flow divider and mechanically connected to each of the tubes, and wherein the tube assembly has a second coupler element that is plate-shaped and/or structurally identical to the first coupler element and that is positioned further away from the first flow divider than from the second flow divider and mechanically connected to each of the tubes.

24. The measuring system according to claim 23, further comprising:

a support frame in the form of a transducer protective housing, wherein the support frame and the tube assembly are fastened to one another detachably by their first and second flow dividers.

25. The measuring system according to claim 24, wherein the first and second vibration exciters are mechanically connected to the support frame; and/or wherein the first, second, third, and fourth vibration sensors are mechanically connected to the support frame.

26. The measuring system according to claim 24, wherein the electronics protective housing for the measuring system electronics unit is fastened to a support frame of the transducer.

27. The measuring system according to claim 1, wherein the first vibration exciter is configured to convert electrical power with a time-varying electrical current into mechanical power in such a way that a time-varying driving force acts on the first tube at a point of application formed by means of the first vibration exciter on the first tube mechanically connected thereto; and/or wherein the second vibration exciter is configured to convert electrical power with a time-varying electrical current into mechanical power in such a way that a time-varying driving force acts on the second tube at a point of application formed by means of the second vibration exciter on the second tube mechanically connected thereto; and/or wherein the first vibration exciter is not mechanically connected to the second tube or has no component mechanically connected to the second tube; and/or wherein the second vibration exciter is not mechanically connected to the first tube or has no component mechanically connected to the first tube; and/or wherein, apart from the first vibration exciter, the exciter assembly does not have any vibration exciter mechanically connected to the first tube; and/or wherein, apart from the second vibration exciter, the exciter assembly does not have any vibration exciter mechanically connected to the second tube.

\* \* \* \* \*